United States Patent
Sønju et al.

(10) Patent No.: US 10,260,778 B2
(45) Date of Patent: Apr. 16, 2019

(54) GEOTHERMAL POWER PLANT

(71) Applicant: GEOVARME AS, Drammen (NO)

(72) Inventors: Otto Kristian Sønju, Trondheim (NO); Bjørn Halmrast, Røkland (NO); Per Thomas Moe, Drammen (NO)

(73) Assignee: GEOVARME AS, Drammen (NO)

( * ) Notice: Subject to any disclaimer, the term of this patent is extended or adjusted under 35 U.S.C. 154(b) by 124 days.

(21) Appl. No.: 14/915,518

(22) PCT Filed: Aug. 27, 2014

(86) PCT No.: PCT/NO2014/050153
§ 371 (c)(1),
(2) Date: Feb. 29, 2016

(87) PCT Pub. No.: WO2015/030601
PCT Pub. Date: Mar. 5, 2015

(65) Prior Publication Data
US 2016/0245550 A1 Aug. 25, 2016

(30) Foreign Application Priority Data

Aug. 27, 2013 (NO) .................................. 20131146

(51) Int. Cl.
F24J 3/08 (2006.01)
F24T 10/10 (2018.01)
(Continued)

(52) U.S. Cl.
CPC ................ *F24T 10/10* (2018.05); *E21B 7/00* (2013.01); *E21B 7/061* (2013.01); *Y02E 10/12* (2013.01)

(58) Field of Classification Search
CPC . E21B 7/06; E21B 7/061; E21B 43/30; E21B 43/305; F24J 3/08; F24J 3/081
See application file for complete search history.

(56) References Cited

U.S. PATENT DOCUMENTS 4,431,069 A * 2/1984 Dickinson, III .......... E21B 7/04
175/61
4,753,485 A * 6/1988 Goodhart .................. E21B 4/02
175/61

(Continued)

FOREIGN PATENT DOCUMENTS

| EP | 2339263 A1 | 6/2011 |
| WO | WO 2007/050530 A1 | 5/2007 |
| WO | WO 2014/070094 A1 | 5/2014 |

*Primary Examiner* — Kenneth L Thompson
(74) *Attorney, Agent, or Firm* — Nixon Peabody LLP

(57) ABSTRACT

A plant for exploiting geothermal energy by circulating water or another fluid through a non-porous geological formation at a substantial depth below the earth surface, comprising multiple heat absorbing/production holes penetrating the said formation, with a total length of several kilometers and spaced more than 50 m apart. The production holes are connected to the surface by one single combined supply and return hole in which upward and downward flow is separated by a pipe comprising an insulating material and a seal. At the given positions of the common supply and return hole manifold zone designs connect the hole to the multiple production holes. The supply and return holes and production holes are closed circuits for transport of a fluid such as water through the said formation. A method for designing and establishing the plant is also disclosed.

24 Claims, 27 Drawing Sheets

(51) Int. Cl.
*E21B 7/00* (2006.01)
*E21B 7/06* (2006.01)

(56) References Cited

U.S. PATENT DOCUMENTS

| | | | | |
|---|---|---|---|---|
| 5,515,679 | A * | 5/1996 | Shulman | F03G 7/04 |
| | | | | 165/104.22 |
| 5,661,977 | A * | 9/1997 | Shnell | E21B 36/00 |
| | | | | 422/212 |
| 5,671,608 | A * | 9/1997 | Wiggs | F24J 3/08 |
| | | | | 165/45 |
| 6,247,313 | B1 * | 6/2001 | Moe | E21B 43/305 |
| | | | | 60/641.2 |
| 8,176,971 | B2 * | 5/2012 | McClung, III | E21B 17/01 |
| | | | | 165/201 |
| 9,127,858 | B2 * | 9/2015 | McKeown | F16L 47/32 |
| 2005/0241834 | A1 | 11/2005 | McGlothen | |
| 2015/0021924 | A1 * | 1/2015 | Parella, Sr. | F24J 3/081 |
| | | | | 290/1 R |

* cited by examiner

GEOTHERMAL POWER PLANT

FIELD OF THE INVENTION

The present invention relates to an energy plant for exploiting geothermal energy by circulating a fluid such as water through a geological formation. The invention also relates to a method for establishing a geothermal energy plant.

BACKGROUND

Even in regions of the world that are not geologically active, the vertical temperature gradient in the earth crust usually exceeds 20° C./km. Hence at a depth of 5000 m, rock temperatures exceeding 100° C. are expected. There are large geographical variations. In some areas not considered geologically active, thermal gradients in the crust exceed the indicated number by a factor of two or more. Gradients lower than 20° C./km appear to be uncommon. High gradients are typically experienced where insulating layers of rock are stacked on top of heat producing rock or intrusions of eruptive rock. Hot Dry Rock (HDR) is rock formations with low porosity and with no natural aquifers. In such rocks heat transfer takes place mainly through conduction. Given the very low conductivity of most types of rock, heat transfer must be expected to be low in the rock. Therefore, efficient methods must be devised in order to extract heat from the rock.

Several methods for exploiting the significant thermal energy stored in HDR formations have been proposed and tested. The most common method consists of drilling one or more water injection holes and a production hole at a different location. By fracturing the rock between the injection and production holes, a closed circuit for water flow can be established in the rock. While drilling costs can be lower than for many alternatives, there are several practical challenges related to the proposed methods. First, it is difficult to control the fracturing process and thereby the establishment of the heat exchanger in the geological formation. Second, water flow in the heat exchanger is difficult to control and optimize as the water will tend to follow the path of least hydraulic resistance and not the path for optimal heat production. Thirdly, the fractured volume is difficult to maintain as the fractures may get clogged and cannot easily be re-opened. Research and development of fractured rock designs has been pursued for half a century with limited practical success.

Recently, methods for extraction of energy from HDR formations depending heavily on drilling technology have been proposed. US 2007/0245729 A1, DE 10 2005 036 472, EP 1 995 457, US 2007/02457729 A1, US 2011/0048005 A1 and US 2011/0061382 A1 describe energy plants applicable for HDR, essentially producing from a set of separate wells with supply and return holes widely separated and connected by single horizontal production holes. A large number of wells are needed to allow a reasonable large heat output, and supply and return holes widely separated would give a rather impractical plant design. In U.S. Pat. No. 5,515,679, U.S. Pat. No. 7,251,938, and U.S. Pat. No. 6,247,313 the hot liquid is returned through a common return hole, and injection and return holes need not be separated. US2011/0067399 A1, CA2679905 A1, DE 43 19 111 A1, US2008/0169084 A1 and WO 2010/021618 A1 describe energy plants applicable for HDR consisting of single wells with integrated supply, production and return holes. The wells consist of single a hole with an internal pipe separating water flow downward and upward water flow. The water is injected in the outer annulus and is gradually heated until reaching the lower end of the pipe where it returns in the inner pipe or vice versa. An alternative version of such a well is given in U.S. Pat. No. 6,000,471 where water injection and return takes place through separate holes, a more expensive alternative. The challenge for all such solutions is to ensure sufficient heat transfer from the rock. A large number of such wells would be required in order to obtain a satisfactory amount of energy output. With significant cost of drilling it would be impractical to establish multiple injection and return wells. Alternatively the method must be combined with fracturing of the rock and to ensure circulation of fluid in the rock. As discussed above, U.S. Pat. No. 6,247,313 describes a geothermal energy plant for HDR formations consisting of multiple production holes and at least one supply and one return hole. The energy plant offers the solution to many of the challenges related to the previously presented inventions. Heat is efficiently being extracted from the rock formation by optimized spacing of production holes. Drilling costs are kept reasonably low by reducing the number of supply and return holes. The concept assumes at least one supply and one return hole. Furthermore, the production holes are assumed to be inclined between 20 and 50 degrees relative to the vertical axis.

Whereas HDR can most efficiently be established through drilling of a set of multiple production holes through the rock formation, it is important to minimize drilling costs. Typically drilling cost constitutes 90% of the cost of establishing the geothermal plant. Supply and return holes are particularly expensive to drill and do not contribute much to heat production. Hence their length should be minimized.

SUMMARY OF THE INVENTION

It is an object of the present invention to provide a geothermal energy plant design combining the supply and return holes and thereby allowing a significant reduction of drilling cost and risk related to plant manufacture. Further cost reduction is allowed by the invention as drilling patterns are optimized with respect to energy output versus drilling costs. Two complementary concepts are presented. In rock formations with high temperature gradients a design with essentially "vertical" production holes can be advantageous due to the simplicity with which the plant can be established. In rock with relatively low temperature gradients energy output is optimized and total cost is reduced by making production holes essentially "horizontal". However, the two concepts, or some combination of the two, are applicable for both low and high temperature gradients, and the design will be chosen based on the actual application and operating conditions of the plant. A method for establishing the presented design of a geothermal energy plant is also claimed.

These and further advantages can be achieved with the invention as defined by the accompanying claims.

BRIEF DESCRIPTION OF THE DRAWINGS

The invention will be further explained by Figures and examples where.

DETAILED DESCRIPTION OF THE INVENTION

Figure 26:
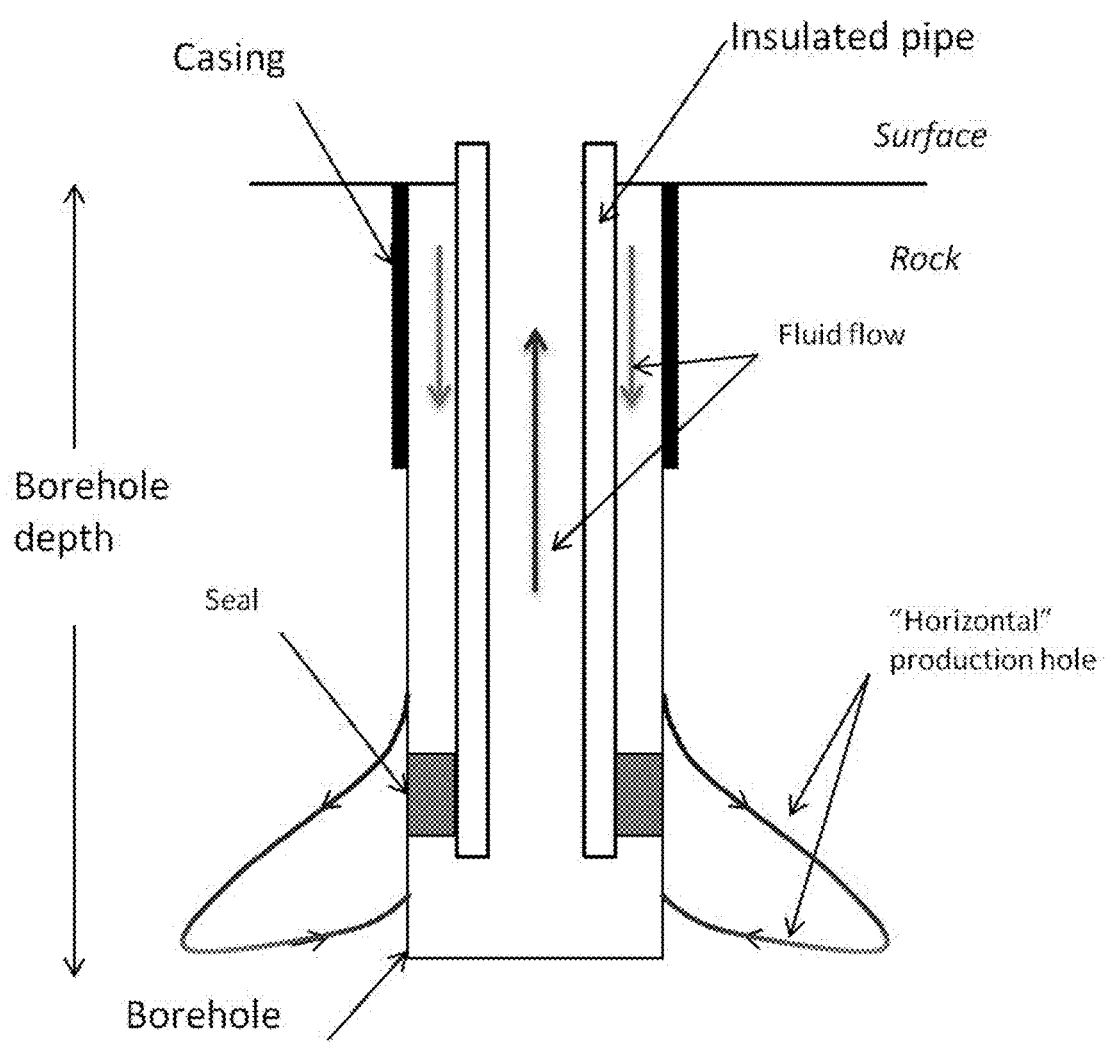
FIG. 26 shows the concept related to "horizontal" production holes.
Figure 27:
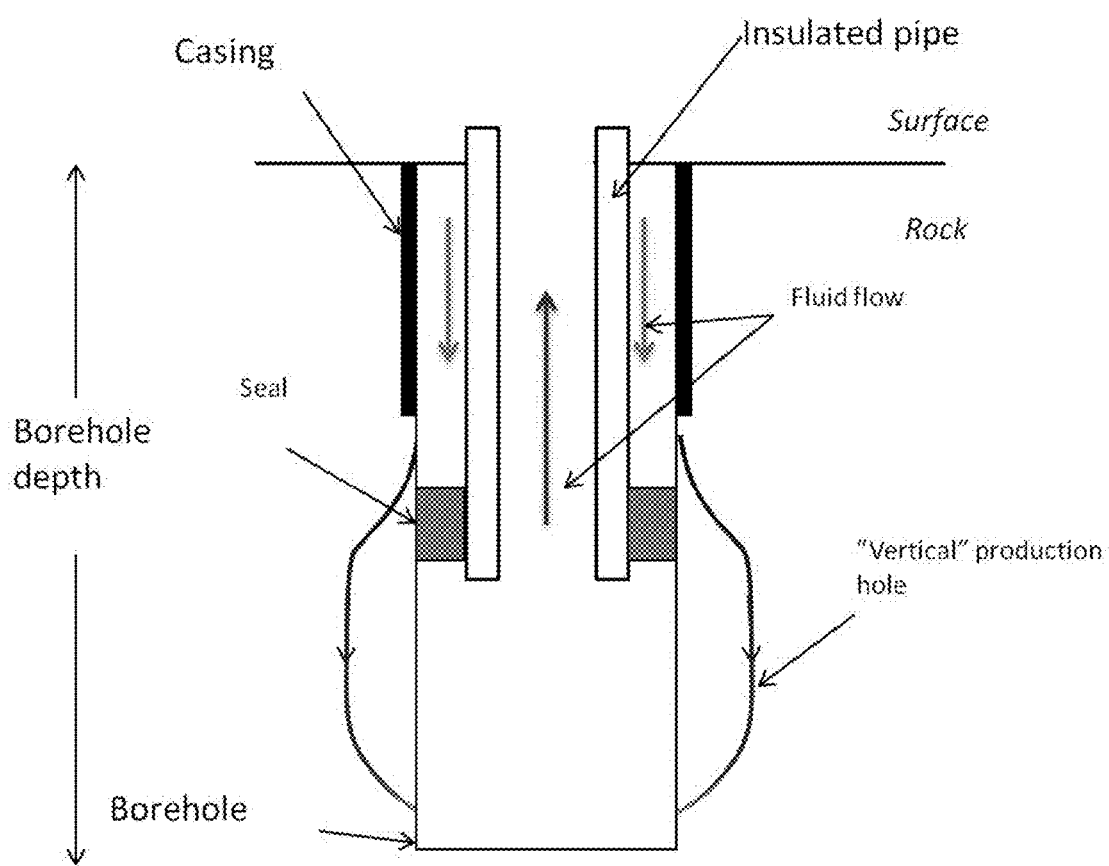
FIG. 27 shows the concept related to "vertical" production holes.

FIG. 26 illustrates the concept related to "horizontal" production holes, while FIG. 27 illustrates the concept related to "vertical" production holes. The main feature common to both concepts is the combined supply and return hole consisting of the borehole with an inner insulated pipe and a seal in the annular space separating the supply fluid flow from the return fluid flow. The insulated pipe can, for example, be a metal pipe with an outer layer of thermally insulating material or consist of only thermally insulating material. There exist various types of seals that can be used. The borehole is extended below the seal with the same or a smaller diameter hole forming a part of the return fluid flow. Casing in the upper part of the borehole is installed as required.

In FIG. 26 the production holes are drilled with an essential horizontal pattern near the bottom of the borehole giving the highest rock temperature and energy output per meter of production hole.

In FIG. 27 the production holes are drilled with an essentially vertical pattern starting higher up in the borehole where the rock temperature is lower and the energy output per meter of the production hole will be lower than the corresponding values in the concept shown in FIG. 26. Depending on the operating conditions the energy output per meter of the production hole for the concept with the horizontal pattern can be 30 to 40% or more higher than the corresponding output for the concept with a vertical pattern.

The combined supply and return hole together with the production holes form a closed loop for the fluid flow as illustrated by the arrows.

The number of production holes will be adjusted according to the total energy output requirement from the plant. Typically the borehole can be 5000 meters deep and the production holes 2000 meters long with a 10 to 20 centimeter diameter. For a thermal energy output of say 2000 kilowatts the borehole diameter is typically 30 to 35 centimeters.

Figure 1:
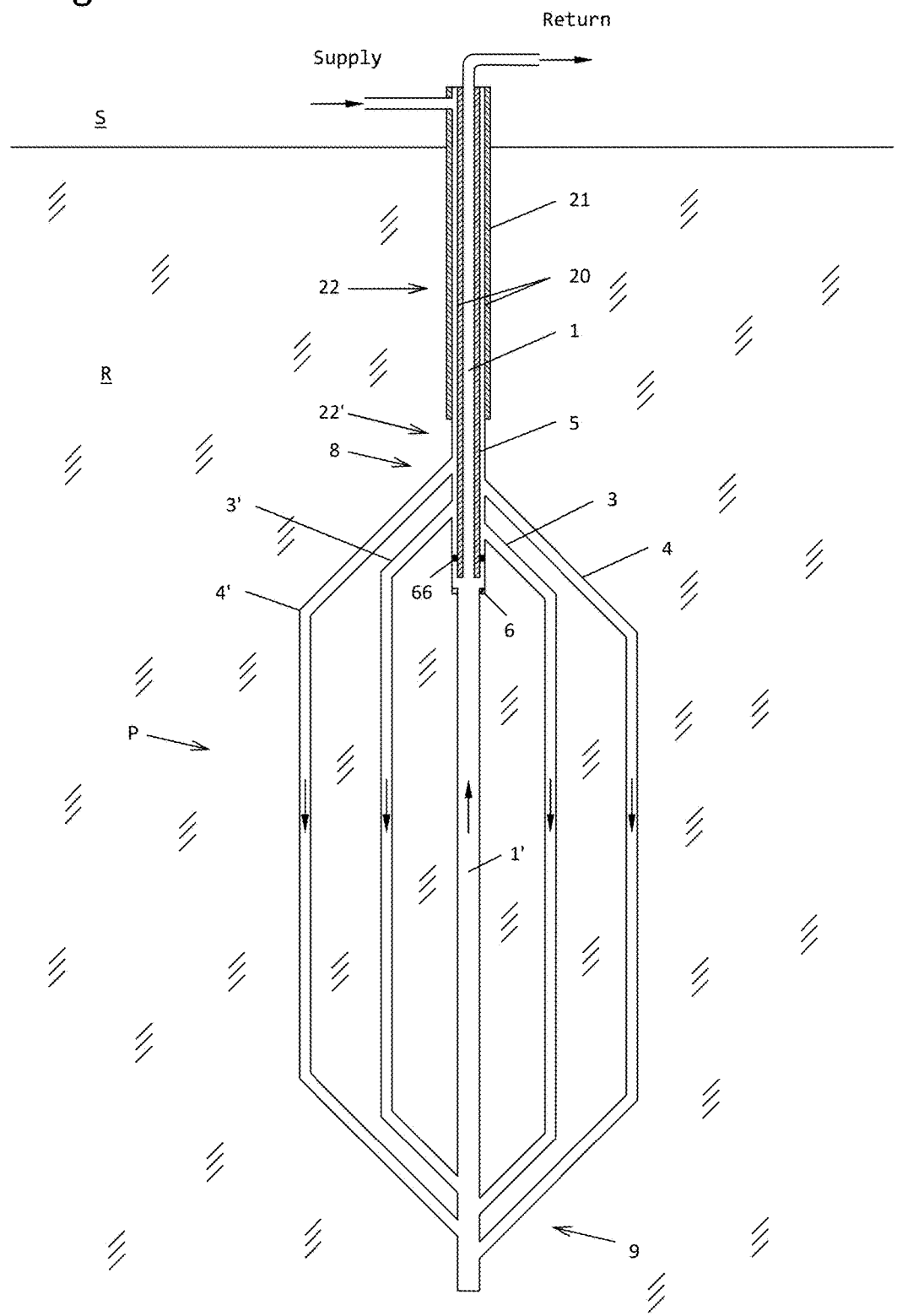
FIG. 1 shows a schematic cross-section of a geothermal energy plant designed for areas with high thermal gradients.

FIG. 1 shows a schematic cross-section drawing of an energy plant for rock R regions with high thermal gradients. The well consists of a combined supply hole 20 and return hole 1 indicated by 22, 22' extending from the surface S to a first manifold zone 8 at a given design depth of typically several thousand meters. A casing is shown at 21. The combined hole below the casing is denoted 22', while its extension corresponding to the casing is denoted 22. Several production holes 'P' 3, 4 and the return hole 1' extend from the manifold zone 8 to the lowermost part of the plant where they merge in a second manifold zone 9. The length of the production holes must be determined based on the local thermal gradient and the required energy-output. The length is typically several hundred or a few thousand meters long. The holes may be perfectly vertical or inclined relative to the vertical. Fracturing may be performed at the bottom of the well to produce a closed circuit. While there may be several production holes 'P' 3, 4; 3', 4', there is only one return hole 1, 1'. The diameter of the return hole may be larger than those of the production holes. As there are several production holes 'P', the water volume passing through the return hole needs to be several times the volume passing through a single production hole. The uppermost part of the return hole 1 is separated from the supply hole 20 by a pipe 5. The supply hole 20 is formed as an annulus supplying the cold water. The annulus is formed by a pipe 5 consisting of an insulating material or a metallic pipe provided with insulation and separates the return hole 1 and the supply hole 20.

For the proposed design the diameter of the lower part of the return hole 1', i.e. the part below the manifold zone 8 need to be less than that of the combined supply and return hole 22, 22'. In the transition between the lowermost supply hole and the combined return and supply hole there can be placed an anchor 6 for a whip-stock (not shown) under its manufacture. This anchor is designed in such a way that it is possible to drill through it or guide tubing or similar through it, for example for the purpose of cleaning the holes. The anchor can also include a seal 66 separating and isolating the supply and return flows. In one alternative, the anchor can be removed and be replaced with a seal 66 to seal off the annulus (supply hole 20) between the pipe 5 and the combined hole 22'. In the annulus between the pipe 5 and the combined hole 22, there can be arranged spacers to stabilize the pipe 5 (not shown).

Figure 2:
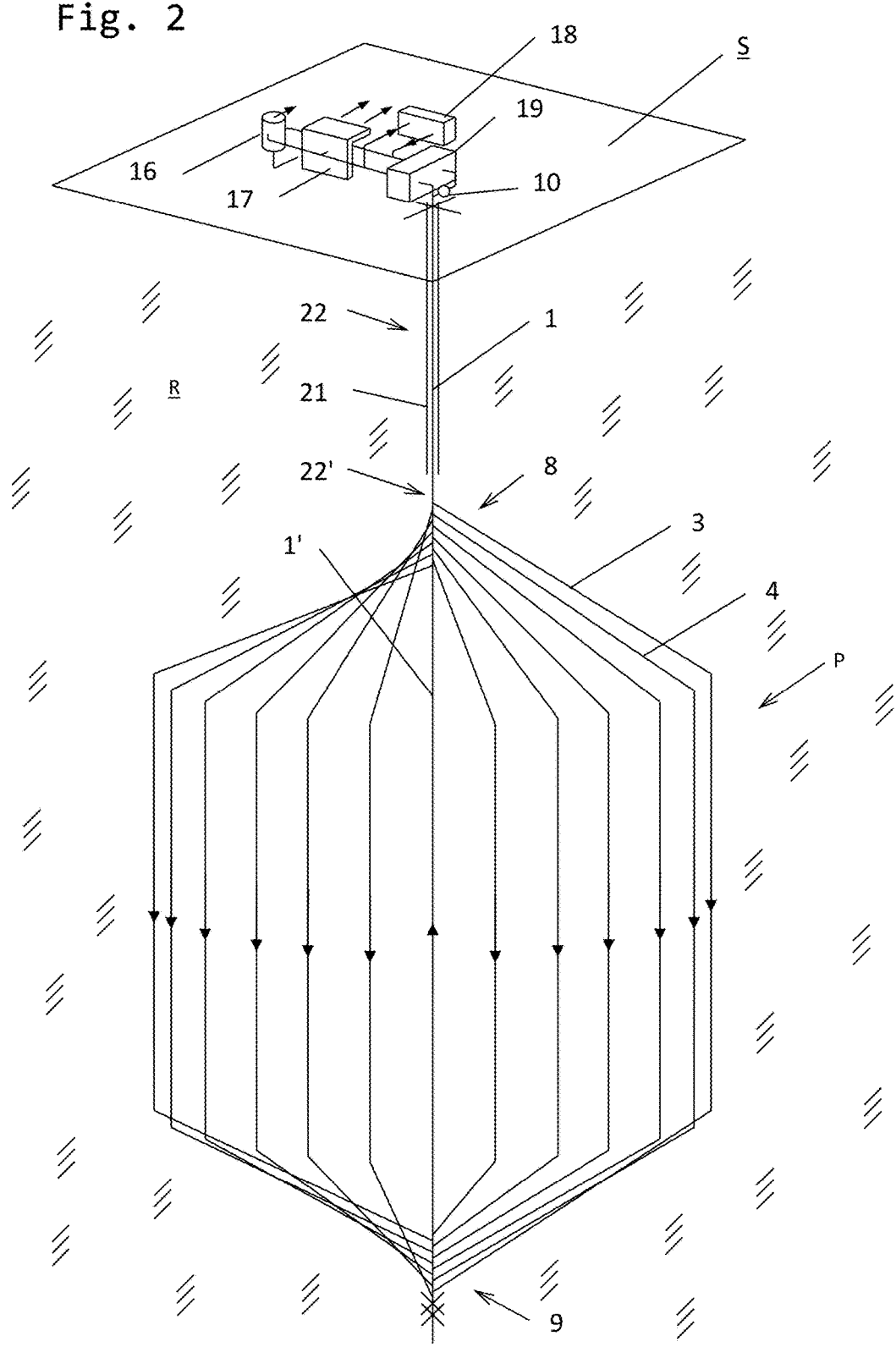
FIG. 2 shows a three-dimensional drawing of the geothermal energy plant described in FIG. 1.

FIG. 2 shows a three dimensional schematic drawing of the same type of plant design as shown in FIG. 1. The lower return hole 1' and the combined supply and return hole 22, 22' are in the center of the plant. A casing 21 supports the walls of the combined supply and return hole. The production holes 'P' 3, 4 surround the lower part of the return hole 1'. The design need not be symmetric nor do the holes need to be spaced at regular intervals around a circumference. The manifold zone is slightly indicated at pos. 8. The holes should however be spaced more than 50 m apart to ensure optimal energy output during the entire life of the plant. The holes merge in a manifold zone 9. The combined supply and return hole 22, 22' extends to the earth's surface S. At the surface there is a energy plant that includes a circulation pump 10 and a heat exchanger 19. Hot liquid (water) is distributed to heat consuming appliances such as a radiator 18, a warm air heater 17 and a hot water tank 16. The hot liquid (water) provided by the well could also be used in heat pumps. Generation of electricity can be an option.

Figure 3:
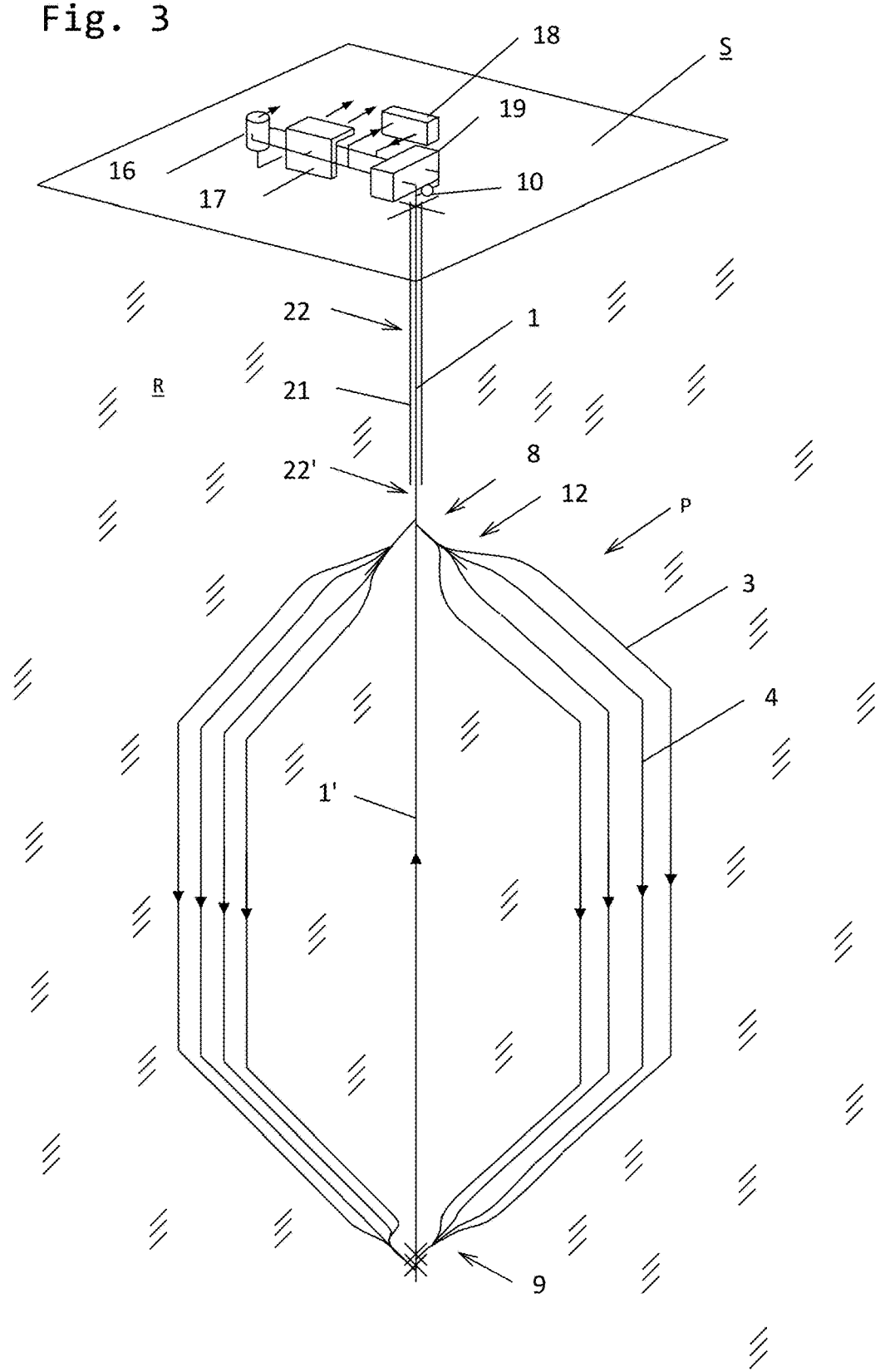
FIG. 3 shows an alternative three-dimensional drawing of the geothermal energy plant described in FIG. 1.

FIG. 3 shows an alternative three-dimensional drawing of the plant design shown in FIG. 1. The lower return hole 1' and the combined supply and return hole 22, 22' are in the center of the plant and forms a central hole. A casing 21 supports the walls of the combined supply and return hole 22. For this application multiple production holes 'P' 3, 4 branch out 12 from each of the original branches from the manifold zone 8 of the combined supply and return hole 22, 22'. This may be achieved by using a whip-stock which is common technology in oil well drilling. It is also possible to establish the proposed design by branching production holes directly out from the center hole using only one whip-stock in the center hole. A large number of production holes can be arranged in such a parallel manner, and the plant design is expandable. Neither the return hole 1' nor the production holes 'P' 3, 4 need to be vertical as shown in the figure, but rather inclined relative to the vertical in some way. The production holes need not converge at the return hole at the same position in a manifold zone 9. Fracturing may be employed to enhance circulation and simplify plant completion. The combined supply and return hole extends to the earth's surface S. Topside items 10, 16-19 are the same as for FIG. 2.

Figure 4:
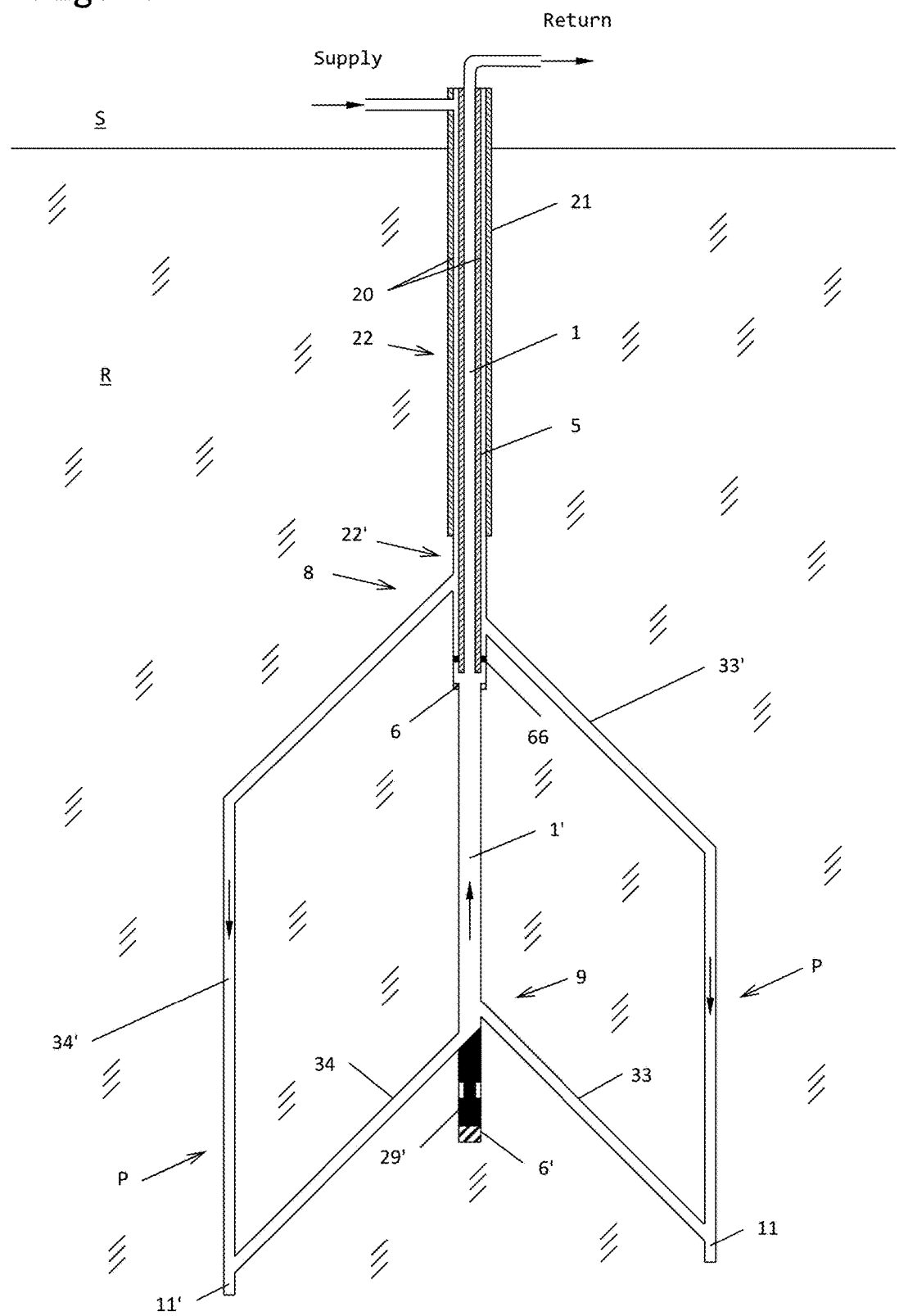
FIG. 4 shows a schematic cross-section of an alternative geothermal energy plant designed for areas with high thermal gradients.

FIG. 4 shows a schematic cross-section drawing of an alternative energy plant for regions with high thermal gradients. The well also consists of a combined supply and return hole extending from the surface to a manifold zone 8 at a given design depth of typically several thousand meters. Several production holes 'P' 33' & 33, 34' & 34 and the return hole 1, 1' extend from the manifold zone 8 to the lowermost part of the plant where they merge in a manifold zone 9. The length of the production holes must be determined based on the local thermal gradient and the required energy-output. However, production holes may typically extend a few thousand meters. The holes may be perfectly vertical or inclined. While there may be several production holes there is only one return hole. The diameter of the return hole may be larger than those of the production holes. The water volume passing through the return hole needs to be several times the volume passing through a single production hole. The uppermost part of the return hole 1 is isolated from the annulus 20 supplying the cold water by a pipe 5 comprising thermally insulating material. For the proposed design the diameter of the lower part of the return hole 1' need to be less than that of the combined supply and return holes. In the transition between the lowermost supply hole and the combined return and supply hole there is an anchor 6 for a whip stock. This anchor must be designed in such a way that it makes it possible to drill through it or guide tubing or similar through it. Further, a seal 66 is arranged to separate the supply and return flows. At the bottom of the central hole there is another whip stock 29' supported by anchor 6' allowing drilling of lower holes 33, 34 meeting upper holes 33', 34' in connection points 11, 11'. In the case that the production holes are mainly vertically aligned, it would not be feasible to use a single whip stock to produce lower and upper holes, because it would be too long. The hole connecting the production and return holes may be inclined relative to the horizontal. Fracturing may be performed at the connection points 11, 11' to ensure a closed circuit.

Figure 5:
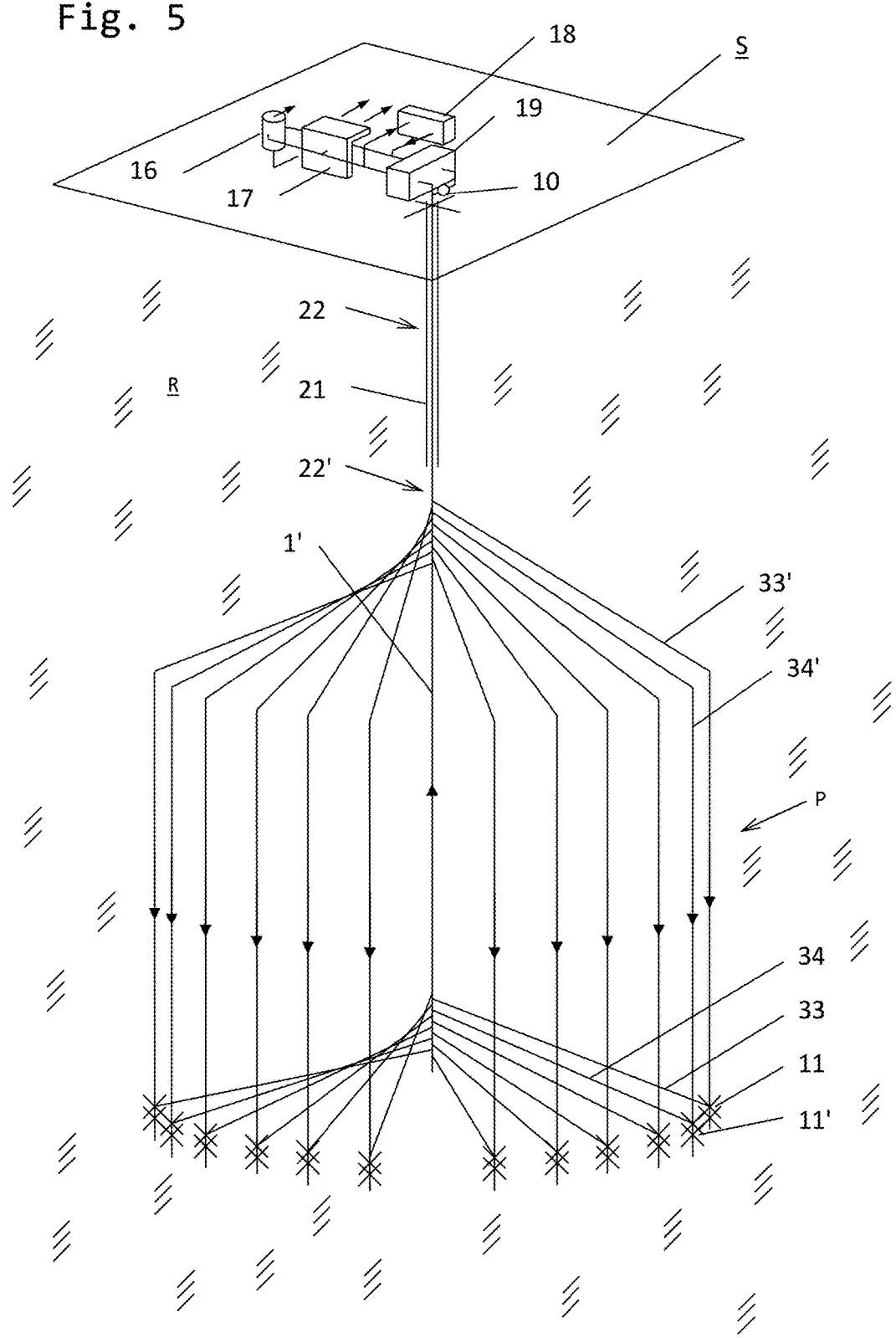
FIG. 5 shows a three-dimensional drawing of the geothermal energy plant described in FIG. 4.

FIG. 5 shows a three-dimensional application of the design presented in FIG. 4. There is a common supply and return hole 22, 22' partly protected by a casing 21 extending to a pre-defined depth. The casing may not be required in non-porous rock. Below the casing production holes depart from the central hole in sidetracks drilled using a whip stock in different positions. For the design shown in FIG. 5 when viewing from the top the production holes 'P' 33' & 33, 34' & 34 are placed on a circle surrounding the central return hole 1'. As in FIG. 4, there is shown connection points 11, 11' between lower holes 33, 34 and holes 33', 34'. Other designs and configurations could also be used. Topside items 10, 16-19 describe the top side energy plant in the same way as in FIG. 2.

Figure 6:
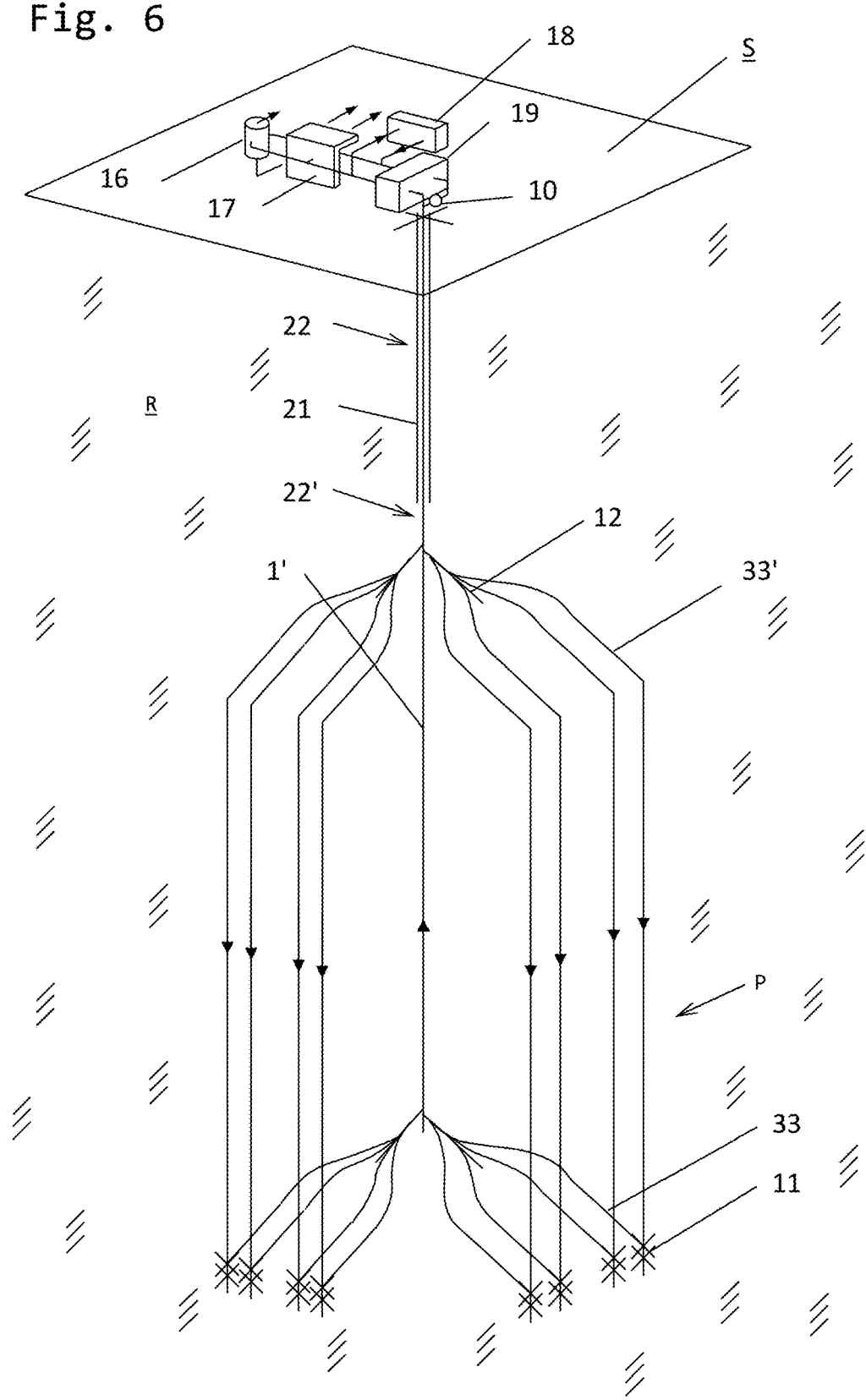
FIG. 6 shows an alternative three-dimensional drawing of the geothermal energy plant described in FIG. 4.

FIG. 6 shows an alternative three-dimensional design of the energy plant presented in FIG. 4. For this geometry fewer holes are initially side-tracked from the central hole, but new side-tracking is then subsequently performed from the holes running from the initial side-tracks as shown in 12. The same approach is applied for the holes 33 running from the end of the return hole 1' to the mainly vertical holes 33'. Hole 33' could also be sidetracked directly from the central hole, i.e. the hole that after installation represents the common hole 22, 22', removing the need for multiple side tracking. Items 10, 16-19 describe the top side energy plant in the same way as in FIG. 2.

Figure 7:
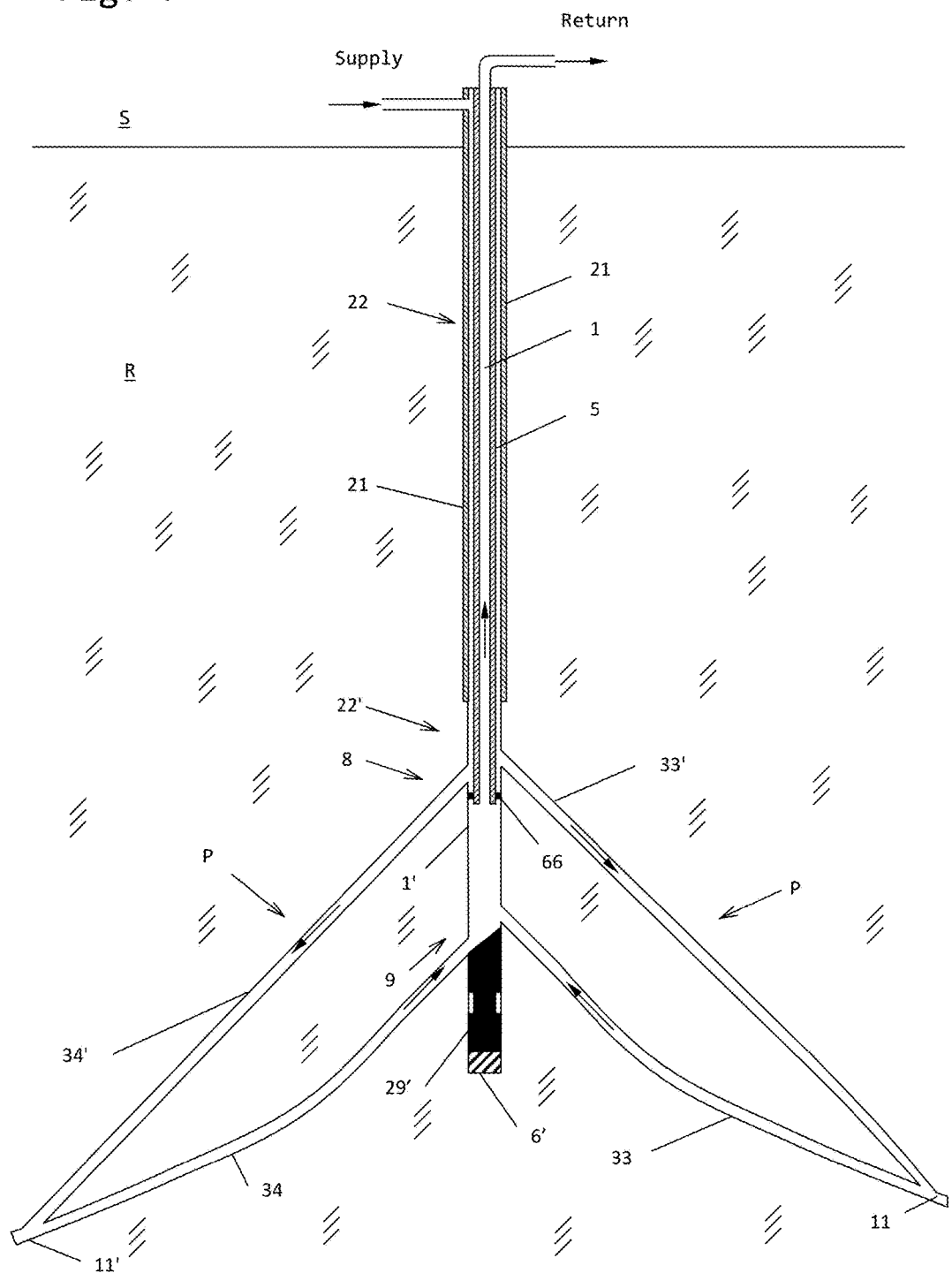
FIG. 7 shows a schematic cross-section of a geothermal energy plant designed for areas with low thermal gradients.

FIG. 7 shows a schematic cross-section drawing of an energy plant for regions with low thermal gradients. In such cases it is advantageous to make production holes as close to horizontal as possible to optimize heat production. The well consists of a combined supply and return hole 22, 22' extending from the surface to a manifold zone 8 at a given design depth of typically several thousand meters. (The drilling of the well and how it is established is described in more details in FIG. 8-10). Several production holes 'P' 33' & 33, 34' & 34 and the return hole 1' extend from the manifold zone 8 to the lowermost part of the plant where they merge in a manifold zone 9. The length of the production holes must be determined based on the local thermal gradient and the required energy-output. The typical length of a production hole exceeds thousand meters. The holes are inclined, but may in the case of low thermal gradients be mainly horizontally directed. While there may be several production holes there is only one return hole. The uppermost part of the return hole 1 is isolated from the annulus supplying the cold water by a pipe 5 comprising a thermally insulating material. In the transition between the lowermost supply hole and the combined return and supply hole there is a seal 66 preventing return flow from merging with the supply flow. The upper 33' 34' and lower 33, 34 holes are in most cases closely spaced for this design (typically a few hundred meters or less), and merged in connections 11, 11'. The holes 33, 34 connecting the upper holes and return hole may be inclined relative to the horizontal. Fracturing may be performed at the connection points 11, 11' to ensure closing of the circulation circuit.

Figure 8:
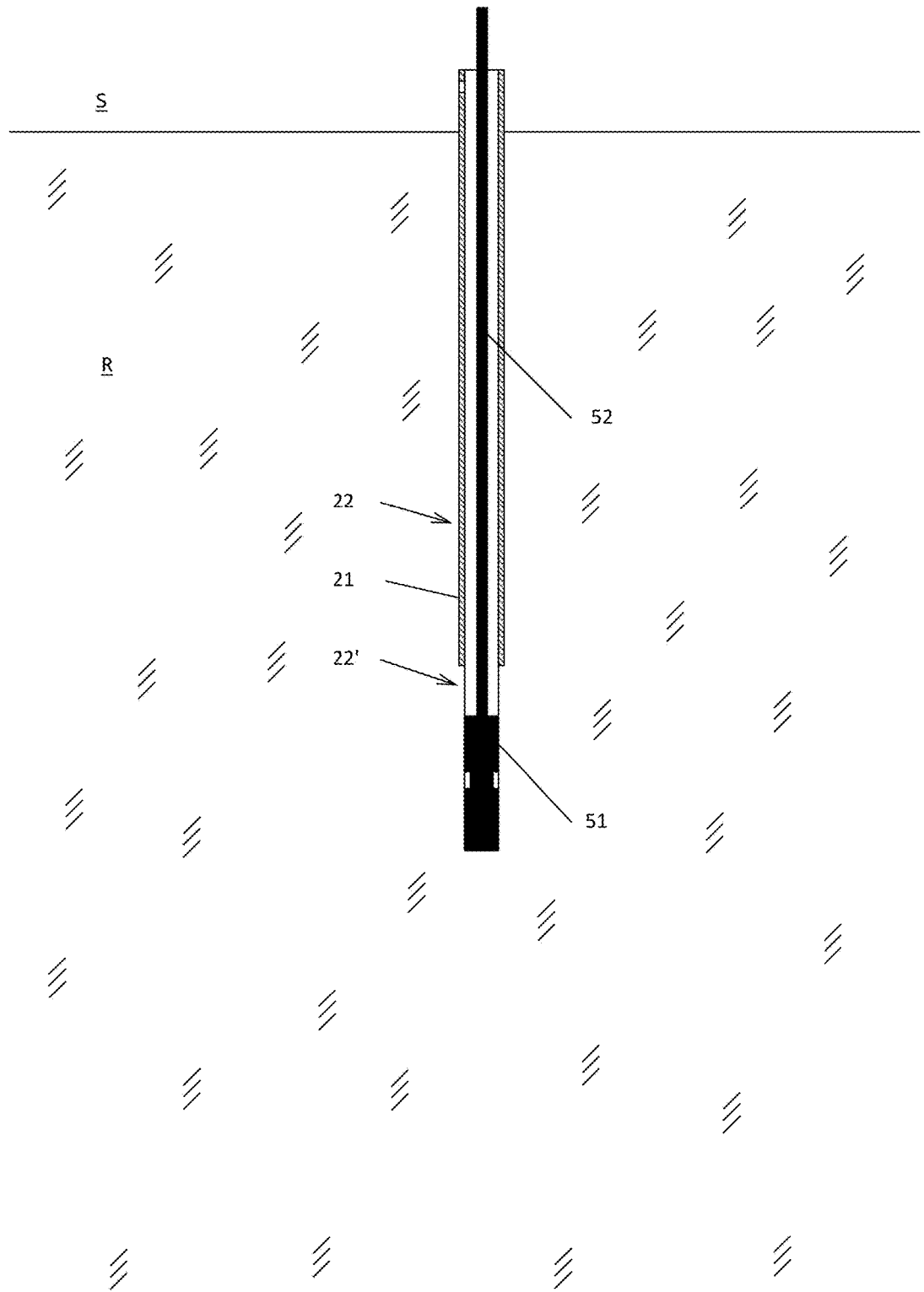
FIG. 8 shows drilling of the combined supply and return center hole common to all the energy plant designs described in this document.

FIG. 8 shows drilling of the combined supply and return center hole 22, 22' common to all the energy plant designs described in this document. The drill for hole 22' is shown as item 51 while the casing supporting the drilled hole 22 is shown as item 21. The extension of the casing will be determined based upon the characteristics of the ground to be drilled in. In particular if there are layers of loose rock or gravel a casing is necessary to keep the combined supply and return hole free of foreign matters. The casing may be made with an insulating material. It should be understood that the diameter of the drill when drilling hole 22' need to be adapted to that of the casing. In this embodiment, the combined hole 22' extends beyond the casing 21 in order to allow for side-track drilling at different depths. The surface is indicated at S, the rock at R. A drill string is shown at 52.

Figure 9:
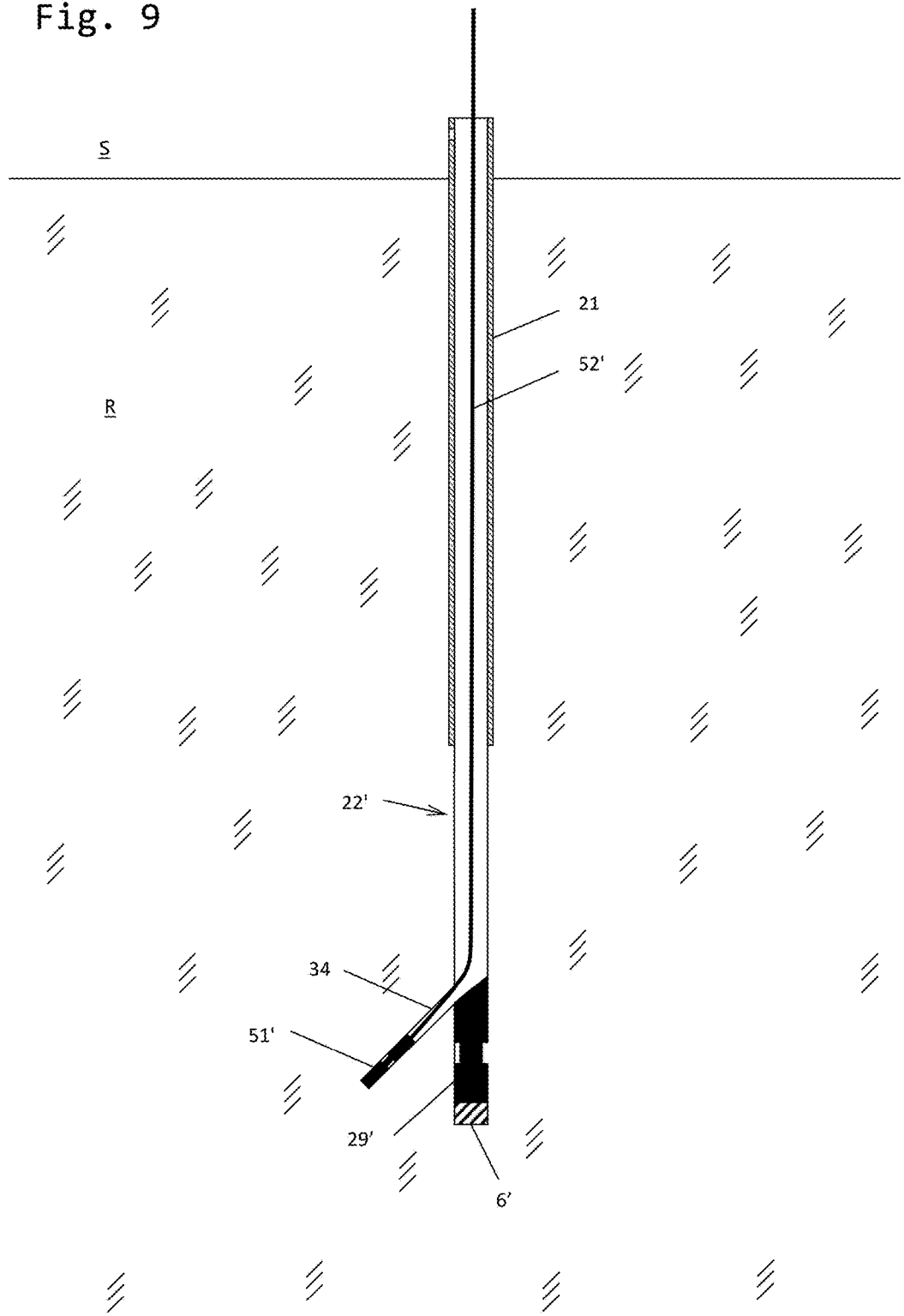
FIG. 9 shows the sidetrack drilling of one of the lower production holes for the energy plant described in FIG. 7.

FIG. 9 shows the application of a smaller drill 51' and drill string 52' during drilling of one of the lower production holes 34. The larger drill 51 and drill string 52 shown in FIG. 8 have been retracted. A whip-stock 29' and anchor 6' has been placed in the lowermost part of the return hole to allow sidetracking at different positions. In the Figure, it is shown that the drill 51' can be guided to the side and downwards by the geometry of the whip-stock. A casing is shown at pos 21.

Figure 10:
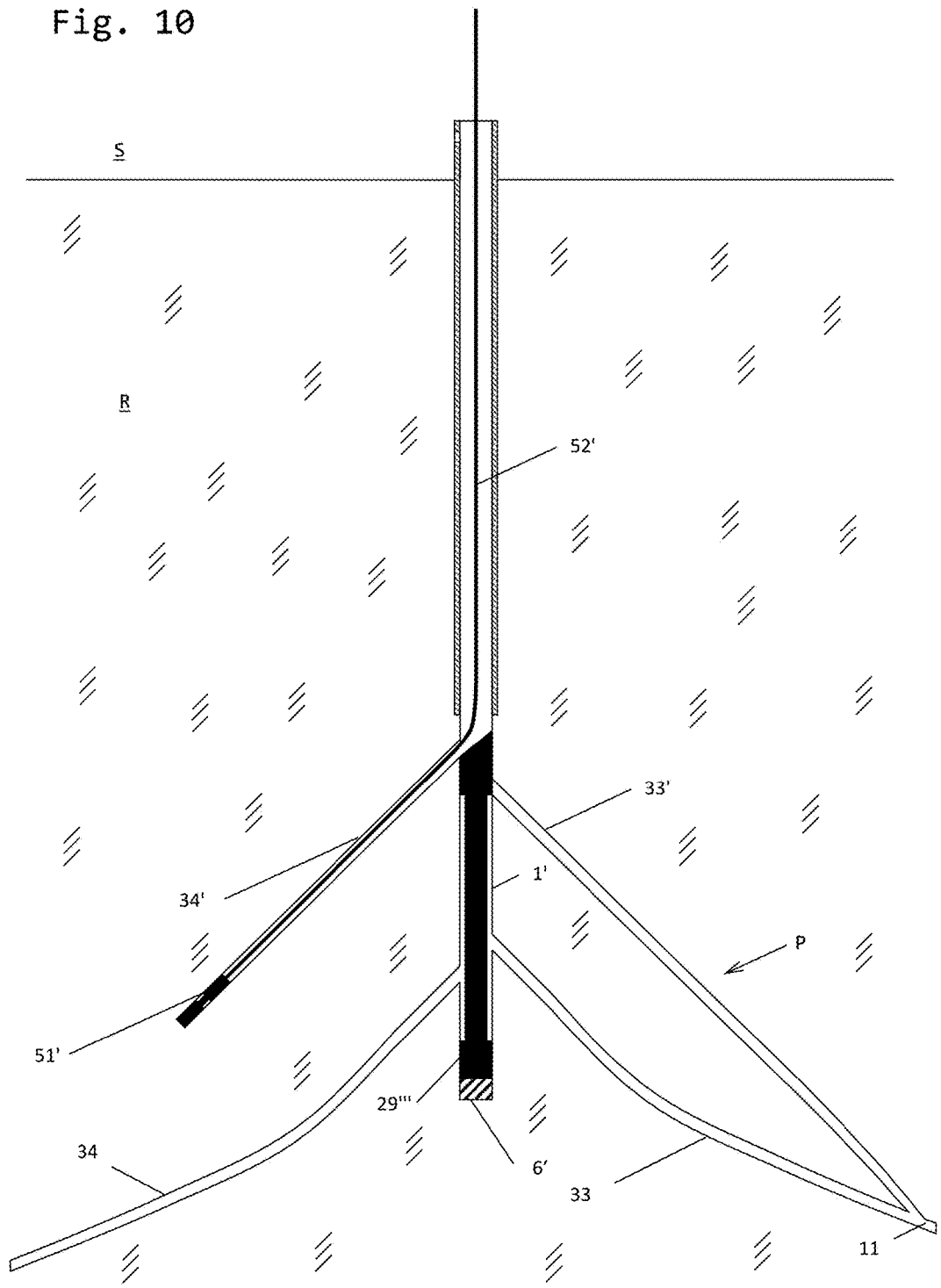
FIG. 10 shows the sidetrack drilling of one of the upper production holes for the energy plant described in FIG. 7.

FIG. 10 shows the drill 51' and drill string 52' during drilling one of the upper holes 34'. The drill and string and also the whip-stock shown in FIG. 9 have been retracted. Following this, a whip-stock 29 that represent an assembly with a larger vertical extension than that shown in FIG. 9 is installed. This allows sidetrack drilling at a given vertical position. By this arrangement, an uppermost hole 34' can be drilled towards a lowermost hole 34 using one of several existing techniques for guided drilling. A completed circulation path or production hole 'P' is shown with an upper hole 33' and a lower hole 33. At the connection point 11 local fracturing may ensure efficient circulation.

For the completion of the installation, i.e. to become as that disclosed in FIG. 7, the drill string and drill are retracted and the whip-stock is removed. The anchor can be left in the bore and a shorter whip-stock 29' can be put in. Then the pipe 5 can be installed into the combined supply and return center hole 22, 22'. The end of the pipe 5 ends somewhere between the upper ends of the upper holes 33', 34' and the upper ends of the lower holes 33, 34, whereby the pipe 5 is sealed against the wall of the bore 1' by means of a seal 66 to separate the supply and return flows in production holes 'P' 33' & 33, 34' & 34 respectively. In this manner a manifold zone 8 can be created.

Figure 11:
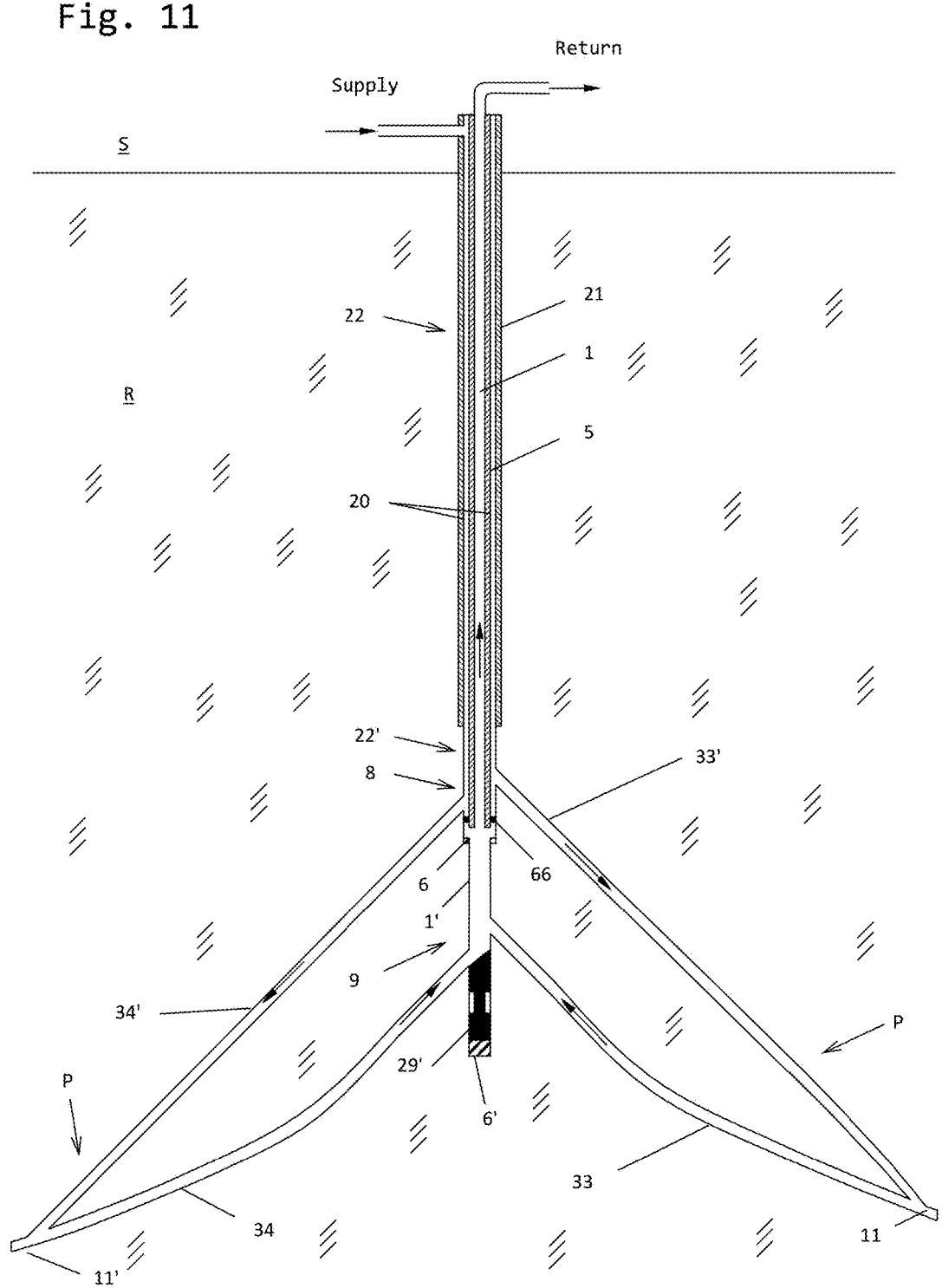
FIG. 11 shows a schematic cross-section of an alternative geothermal energy plant designed for areas with low thermal gradients.

FIG. 11 shows a schematic cross-section drawing of an alternative energy plant for regions with low thermal gradients. Similar to that of the plant shown in FIG. 7, the well also consists of a combined supply and return hole 22, 22' extending from the surface to a manifold zone 8 at a given design depth of typically several thousand meters. Several production holes 33' & 33, 34' & 34 and the return hole 1' extend from the manifold zone 8 to the lowermost part of the plant where they merge in a lower manifold 9. The uppermost part of the return hole 1 is when the installation has been completed, insulated from the annulus supplying the cold water by a pipe 5 comprising an insulating material.

For this proposed design the diameter of the lower part of the return hole 1' is made smaller than that of the combined supply and return hole 22, 22'. This makes it possible to reduce the drilling costs. In the transition between the lowermost part of the combined return and supply hole 22, 22' there is an anchor 6 for a whip stock. This anchor is designed in such a way that it is possible to drill through it or guide tubing or similar through it. Preferably, this is done before the pipe 5 is installed. At the bottom of the return hole there is a whip-stock 29' allowing drilling of lower holes 33, 34 meeting holes 33', 33 in connections 11, 11'. The holes (33, 34) connecting the upper holes 33', 34' and return hole 1' may be inclined relative to the horizontal. When the assembly is completed, the whip-stock and the anchor can be removed, and the insulated pipe 5 can be installed with a seal 66 at its lower part that separates the supply and return flows.

Figure 12:
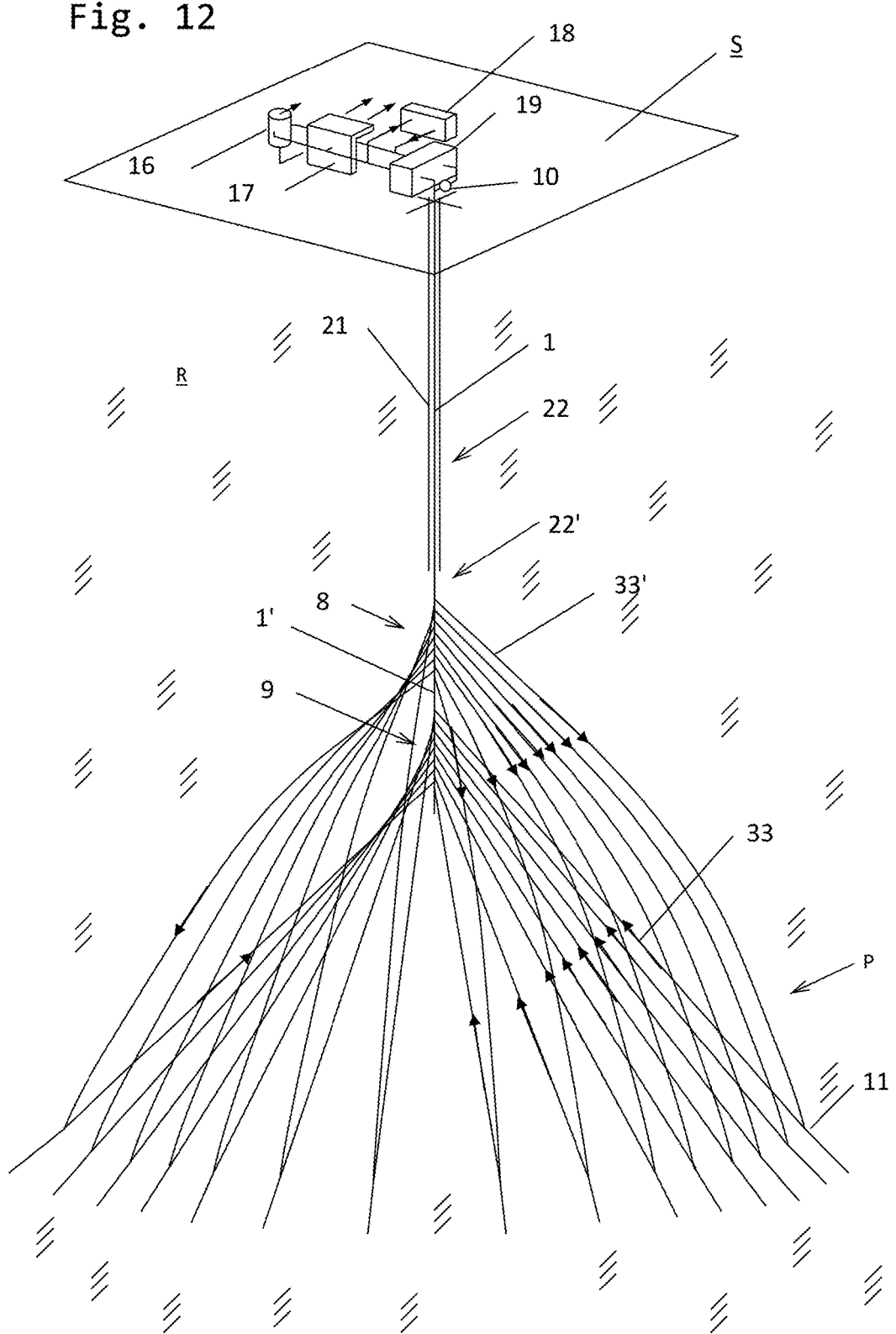
FIG. 12 shows a three-dimensional drawing of the geothermal energy plant described in FIG. 7 and FIG. 11.

FIG. 12 shows a three-dimensional design of the energy plant presented in FIG. 7 and FIG. 11. Production holes 'P' 33&33' are side-tracked from the combined supply and return hole 22'. The return hole 1' extends further. At the bottom of the plant the lower holes 33 are side-tracked from the return hole 1'. Topside items 10, 16-19 describe the top side energy plant in the same way as in FIG. 3. The length of the production holes may be several thousand meters. The inclination of the production holes may be close to horizontal and the holes may be curved in either the shown direction or preferably in the opposite direction. A casing is shown at pos. 21.

Figure 13:
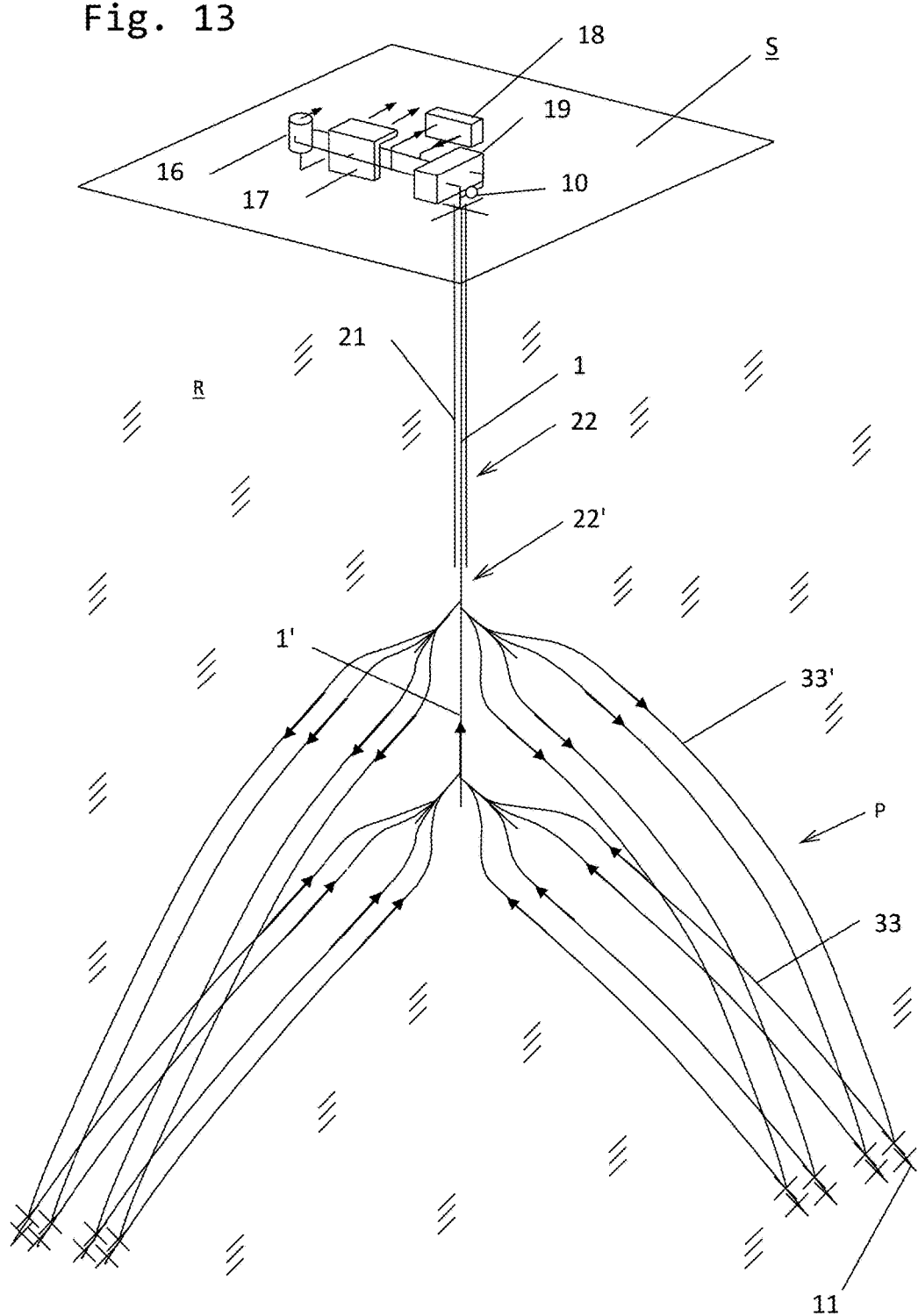
FIG. 13 shows an alternative three-dimensional drawing of the geothermal energy plant described in FIG. 7 and FIG. 11.

FIG. 13 shows an alternative three-dimensional design of the energy plant presented in FIG. 7 and FIG. 11. Upper holes 33' are side-tracked from the combined supply and return hole 22'. Further sidetracking is subsequently performed in order to allow the production holes to extend parallel to great depth. The return hole 1' extends further after side-tracking. At the bottom of the plant the lower holes 33 are side-tracked from the return hole 1'. Further side-tracking is performed in order to extend holes further and to allow the lower part of the production holes to meet up with the upper part of the production holes. Both for the upper and lower part of the production holes it is also possible to establish the design by only performing side-tracking once from the center hole. Topside items 10, 16-19 describe the top side energy plant in the same way as in FIG. 3. A casing is shown at pos. 21.

Figure 14:
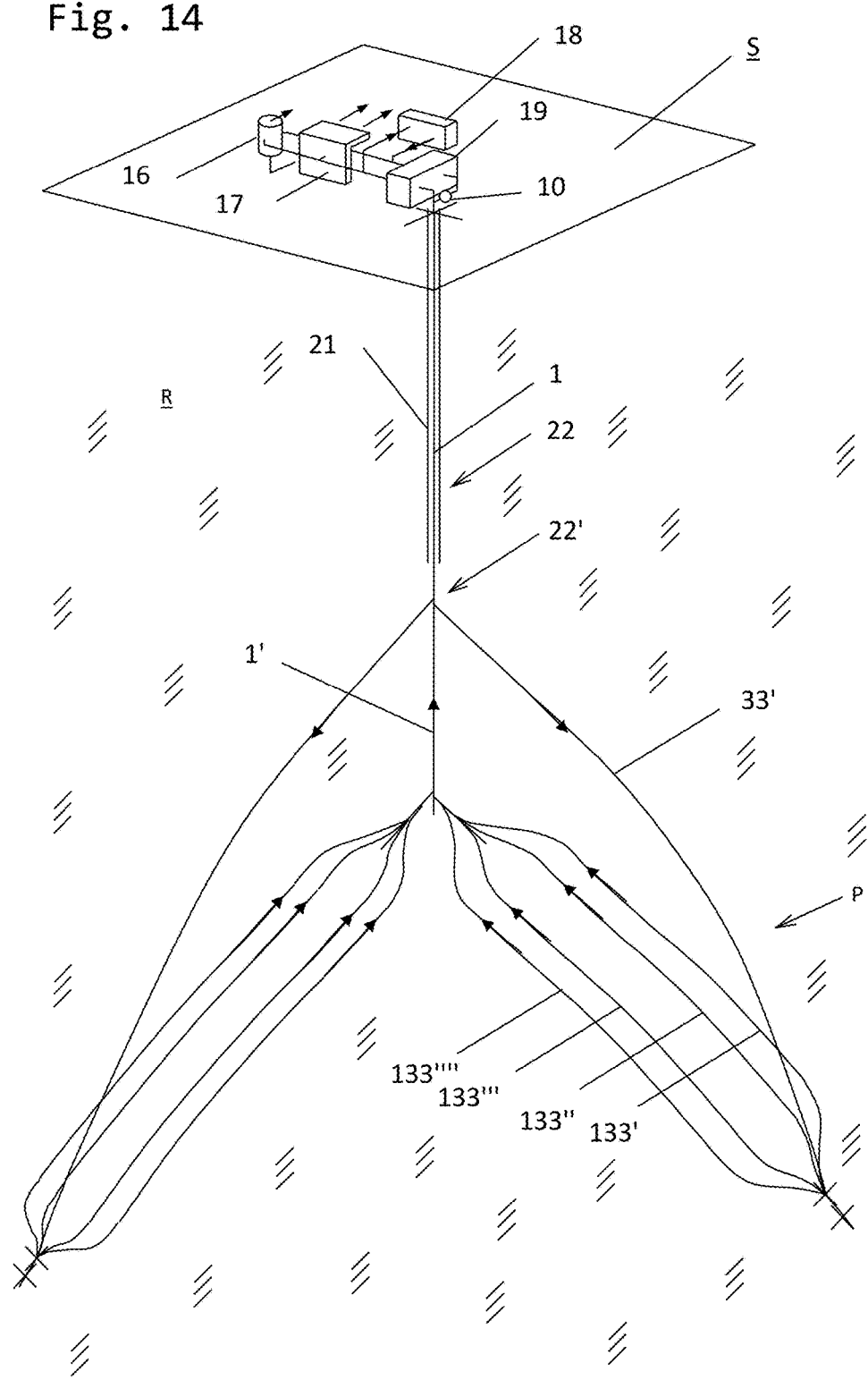
FIG. 14 shows an alternative three-dimensional drawing of the geothermal energy plant described in FIG. 7 and FIG. 11.

FIG. 14 shows an alternative three-dimensional design of the energy plant presented in FIG. 7 and FIG. 11. Upper holes 33' are side-tracked from the combined supply and return hole 22'. However, for this design there is only one upper production/supply hole 33' for each set of lower production holes 133', 133'', 133''', 133''''. The return hole 1' extends further after side-tracking. At the bottom of the plant the lower holes 133', 133'', 133''', 133'''' are side-tracked from the return hole 1'. Further side-tracking is performed in order to extend holes further and to allow the lower part of the production holes to meet up with the upper part of the production holes. Items 10, 16-19 describe the top side energy plant in the same way as in FIG. 2.

Figure 15:
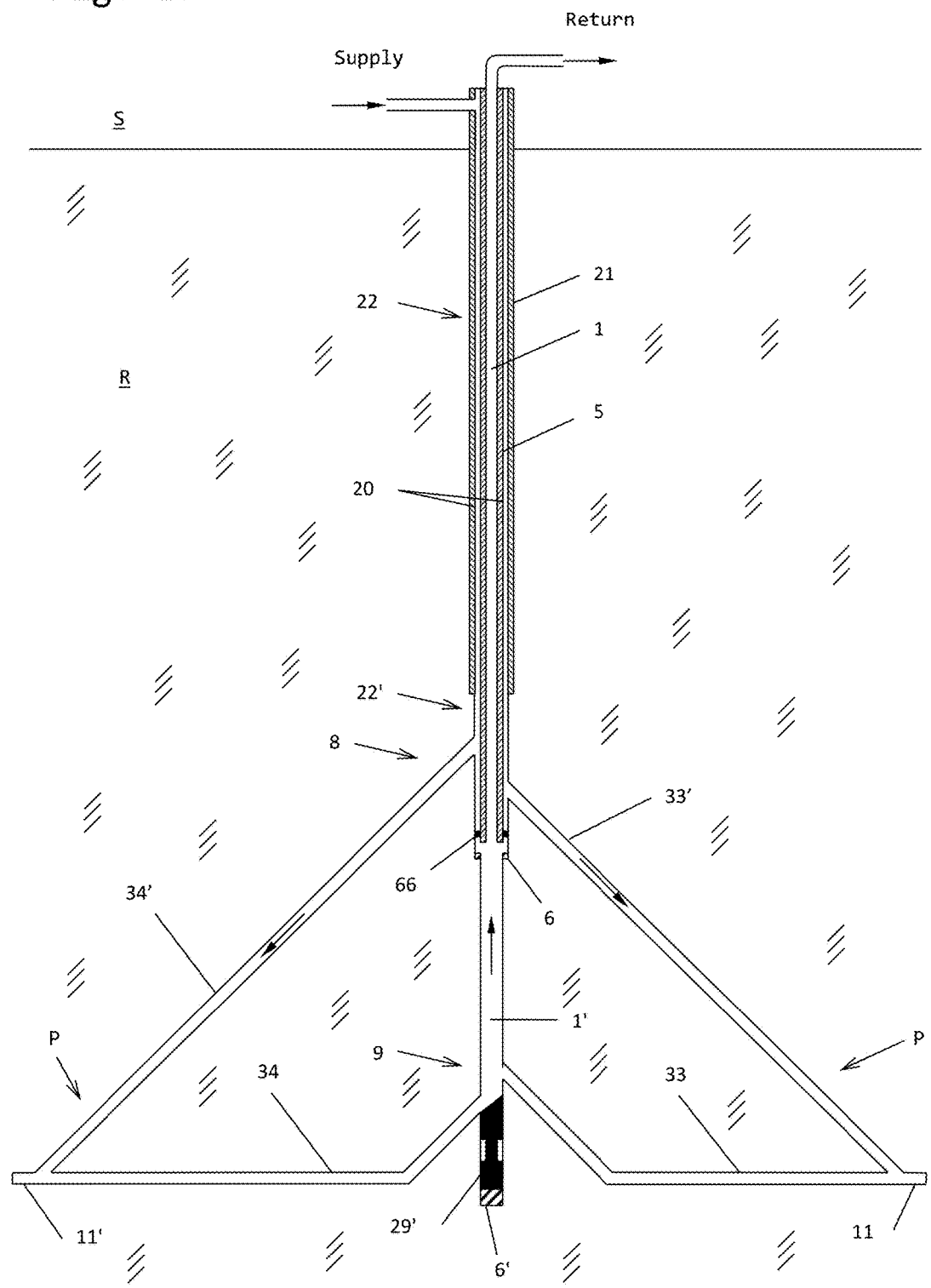
FIG. 15 shows a schematic cross-section of an alternative geothermal energy plant designed for areas with low thermal gradients.

FIG. 15 shows an alternative schematic cross-section drawing of the energy plant for regions with low thermal gradients. The well consists of a combined supply and return hole 22, 22' extending from the surface to a manifold zone 8 at a given design depth of typically several thousand meters. Several production holes 'P' 33' & 33. 34' & 34 and the return hole 1' extend from the manifold zone to the lowermost part of the plant where they merge in a manifold zone 9. The uppermost part of the return hole 1 is separated from the annulus 20 supplying the cold water by a pipe 5 comprising an insulating material and further provided with a seal 66. For the proposed design the diameter of the lower part of the return hole 1' is less than that of the combined supply and return holes. In the transition between the lowermost combined return and supply hole 22' and return hole 1' there is an anchor 6 for a whip stock. This anchor is designed in such a way that it makes it possible to drill through it or guide tubing or similar through it. At the bottom of the central hole there is a whip stock 29' allowing drilling of lower holes 33, 34 meeting holes 33', 34' in connection points 11, 11'. The holes 33, 34 connecting the upper holes 33', 34' and return hole 1' may be inclined relative to the horizontal.

Figure 16:
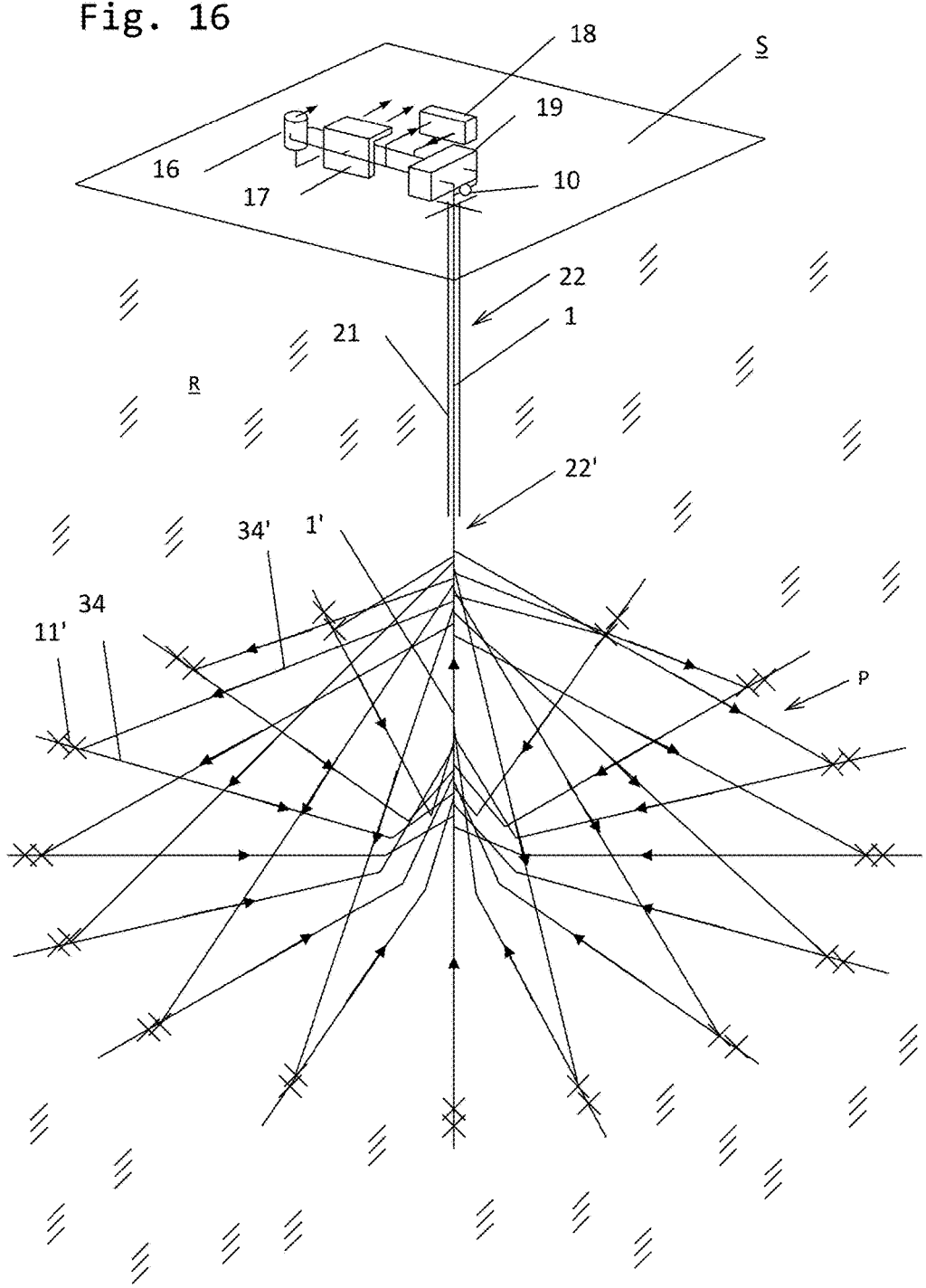
FIG. 16 shows a three-dimensional drawing of the geothermal energy plant described in FIG. 15.

FIG. 16 shows a three-dimensional design of the energy plant presented in FIG. 15. Production holes 3 are side-tracked from the combined supply and return hole 22, 22'. The return hole 1' extends further. At the bottom of the plant the lower production holes 34 are side-tracked from the return hole 1'. Topside items 10, 16-19 describe the top side energy plant in the same way as in FIG. 2.

Figure 17:
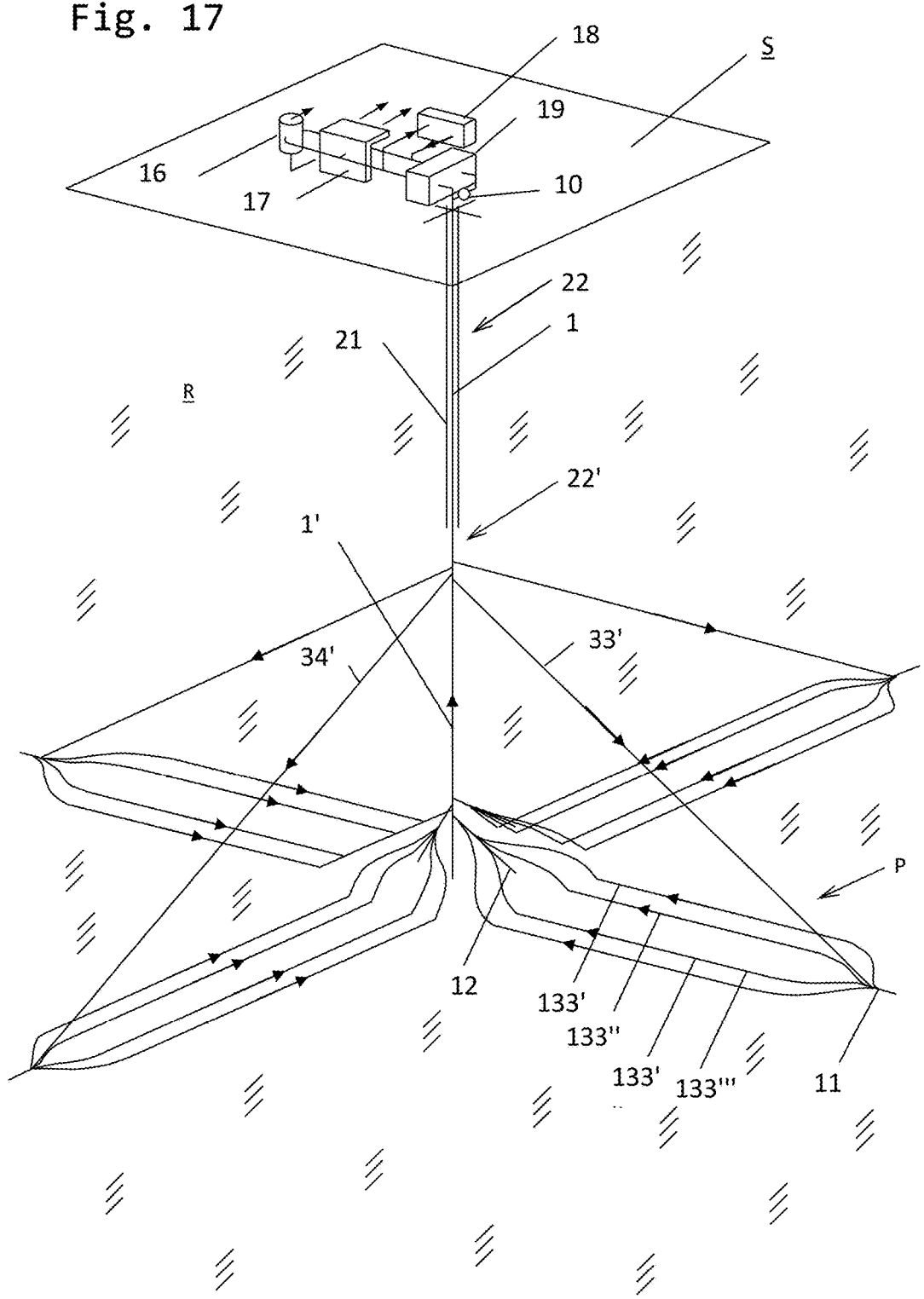
FIG. 17 shows an alternative three-dimensional drawing of the geothermal energy plant described in FIG. 15.

FIG. 17 shows an alternative three-dimensional design of the energy plant presented in FIG. 15. Upper holes 34' are side-tracked from the combined supply and return hole 22'. The return hole 1' extends further. At the bottom of the plant a lower hole 12 is side-tracked from the return hole 1'. The lower holes 133', 133", 133''', 133'''' are further side-tracked to allow for parallel flow paths through the rock. Items 10, 16-19 describe the top side energy plant in the same way as in FIG. 2.

Figure 18:
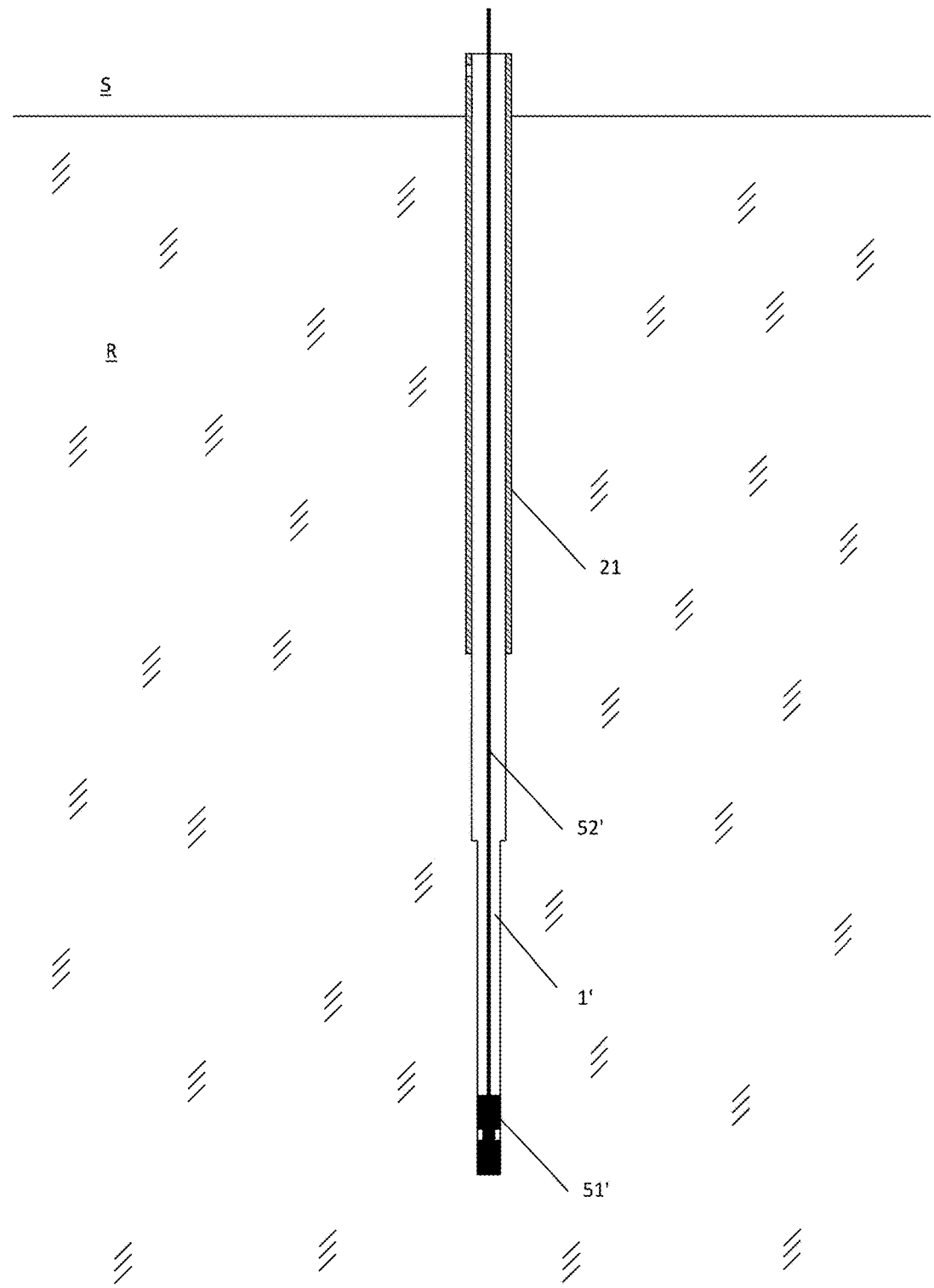
FIG. 18 shows drilling of the lower part of the return hole for the energy plant described in FIG. 15.
Figure 19:
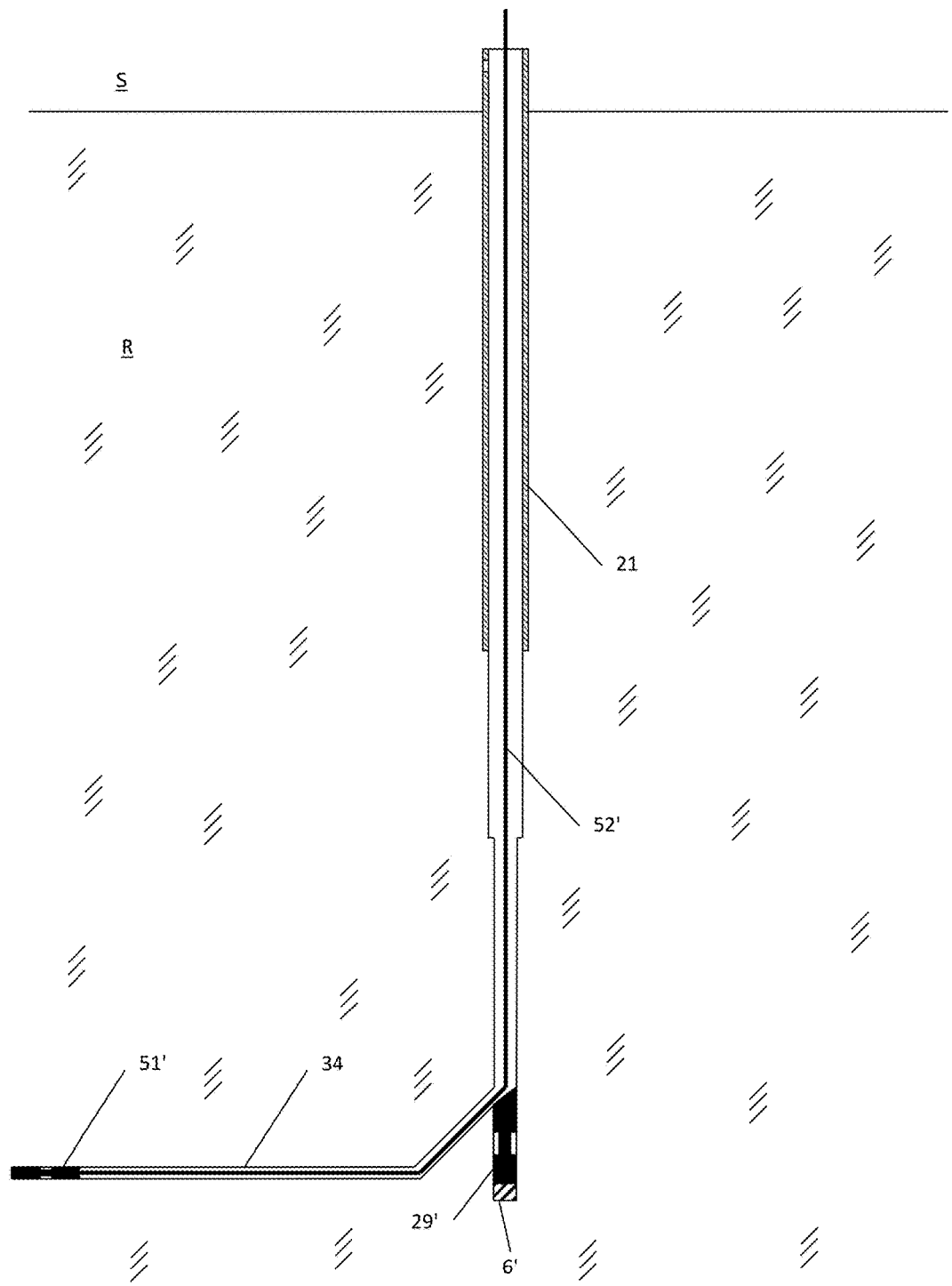
FIG. 19 shows the sidetrack drilling of one of the lower production holes for the energy plant described in FIG. 15.
Figure 20:
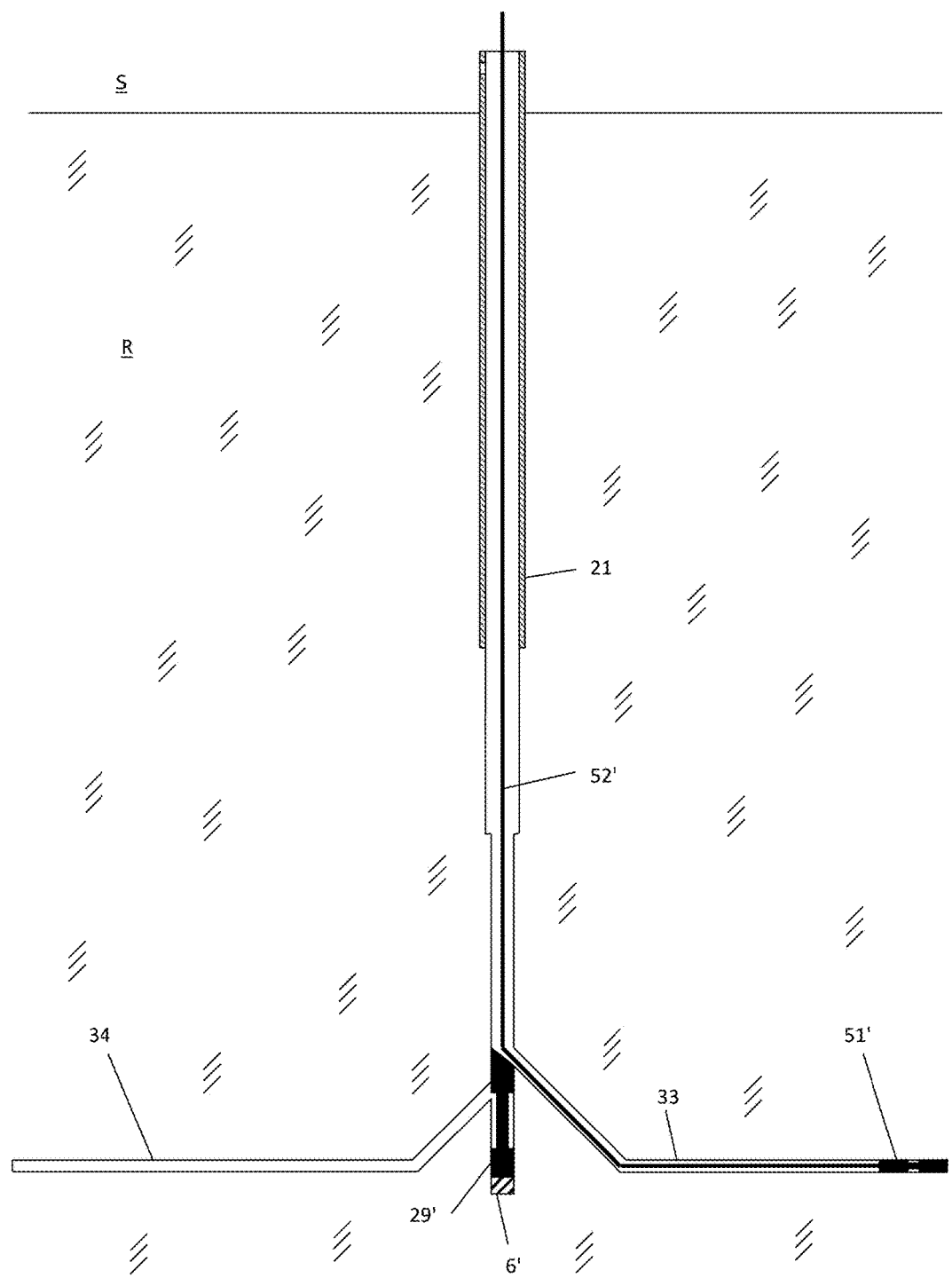
FIG. 20 shows the sidetrack drilling of another of the lower production holes for the energy plant described in FIG. 15.
Figure 21:
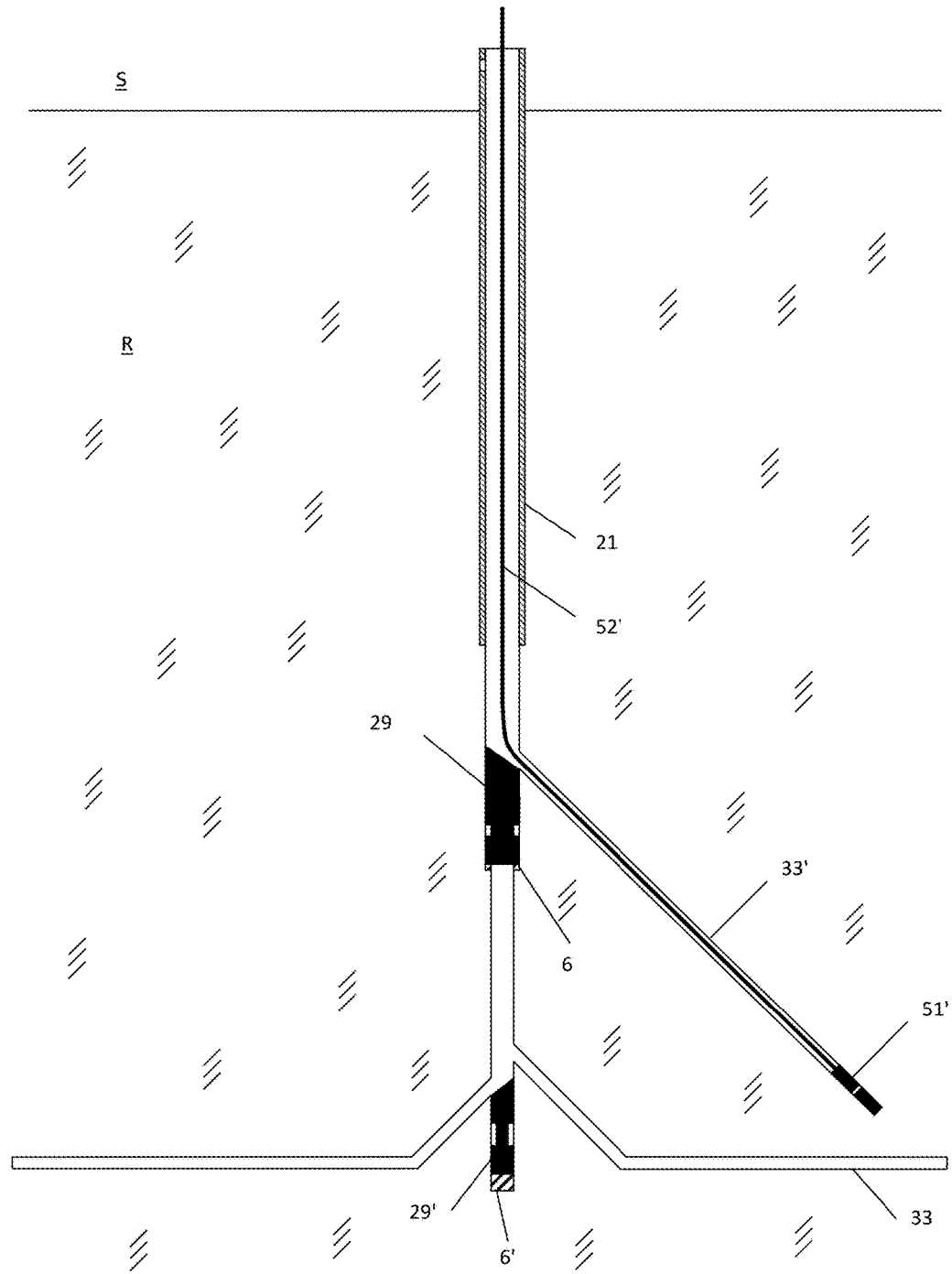
FIG. 21 shows the sidetrack drilling of one of the upper production holes for the energy plant described in FIG. 15.
Figure 22:
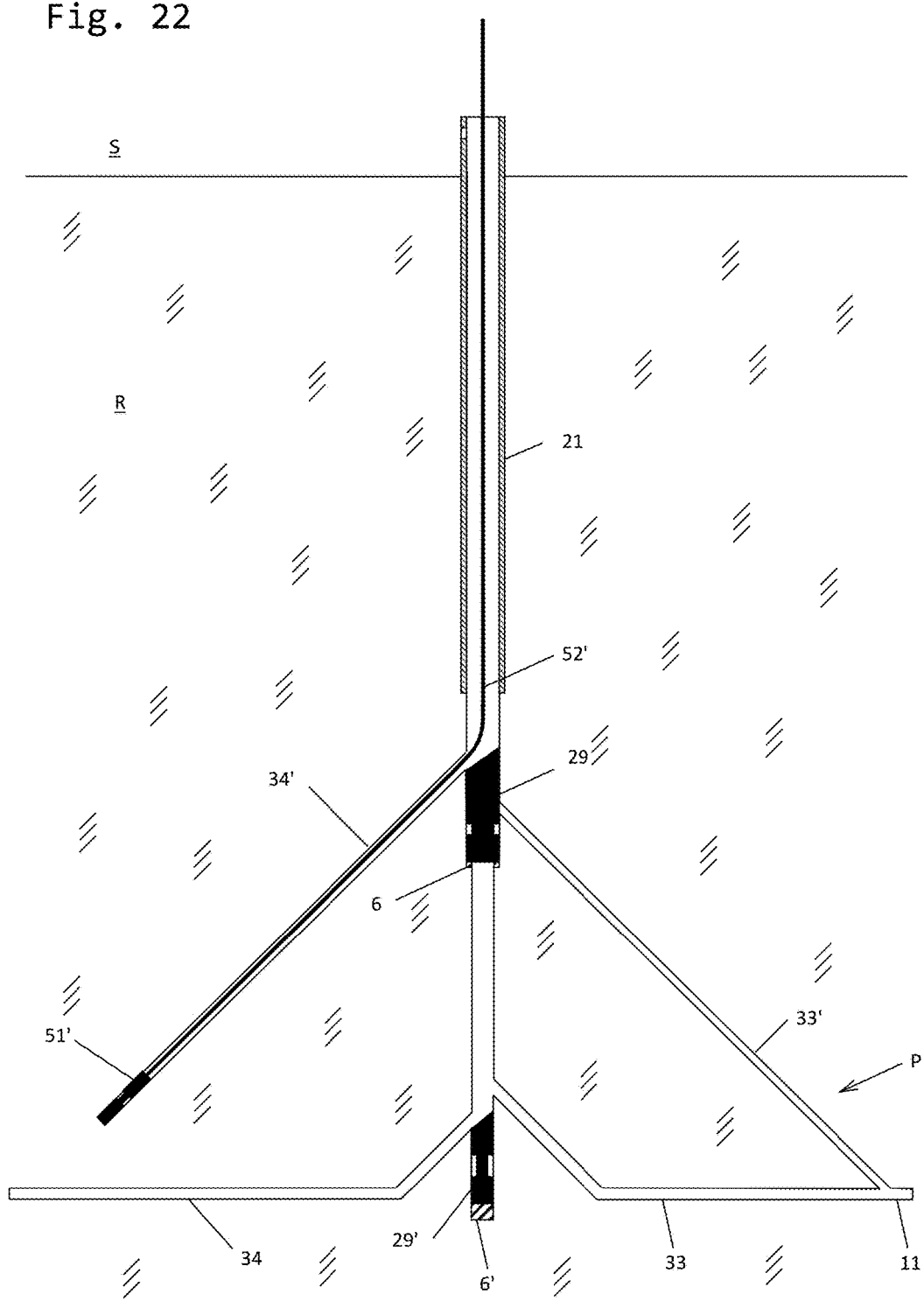
FIG. 22 shows the sidetrack drilling of another of the upper production holes for the energy plant described in FIG. 15.
Figure 23:
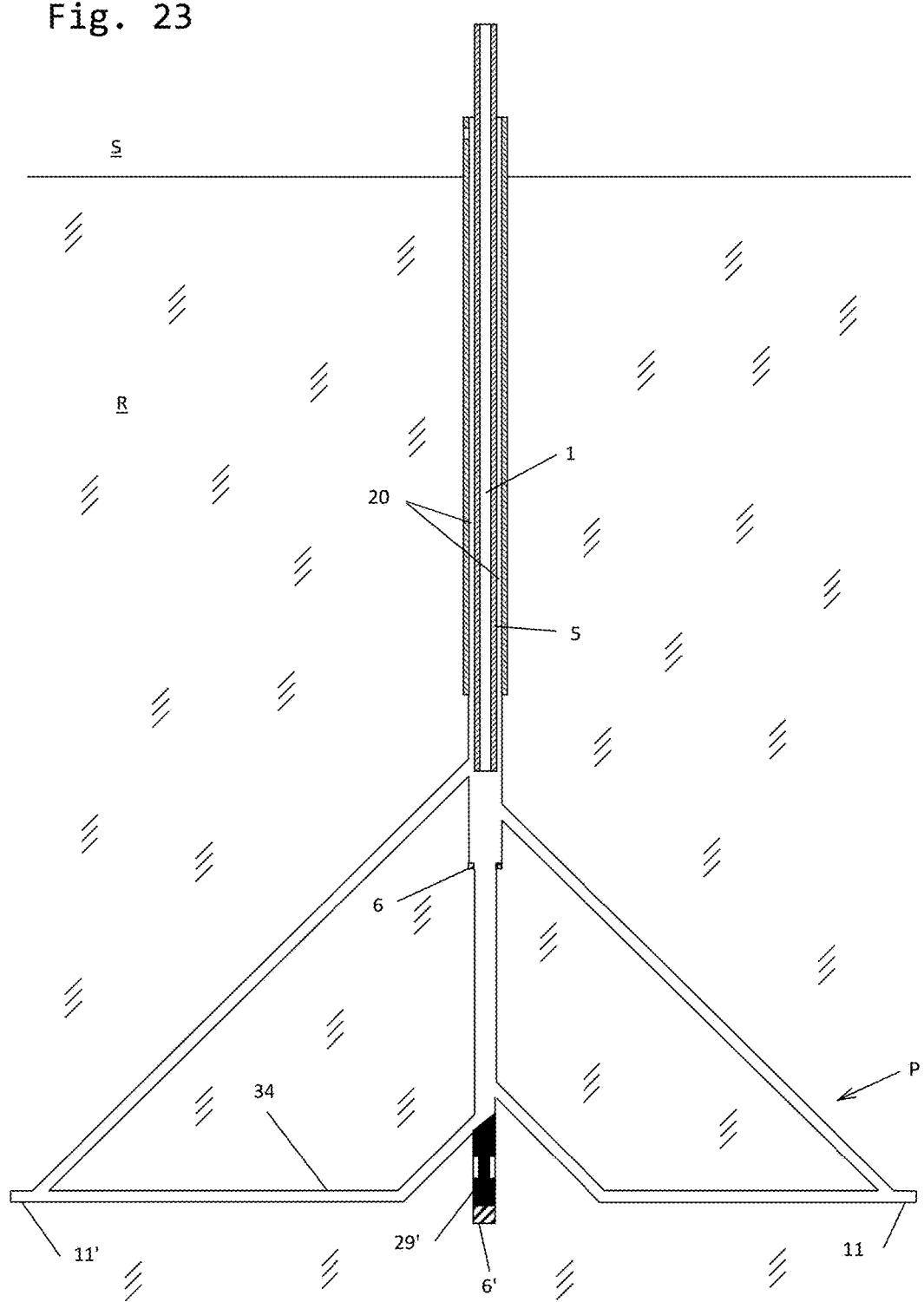
FIG. 23 shows the installation of the insulating pipe separating supply and return flows for the energy plant described in FIG. 15.

FIGS. 18-23 show the process of establishing the energy plant shown in FIG. 17. FIG. 18 shows drilling of the lower part of the return hole 1'. Item 51' is the drill, item 21 is the casing, item 52' the drill string. FIG. 19 shows side-track drilling to establish a lower hole 34. Item 29' is a whip-stock and item 6' an anchor. A second lower hole 33 is drilled in FIG. 20. FIG. 21 shows the drilling of an upper hole 33' to meet up with the lower hole 33. A removable whip-stock 29 is applied in order to allow side-track drilling of the upper hole. Item 51' is the drill. In FIG. 22 a second upper hole 34' is drilled 51' in order to meet the lower hole 34. The whip-stock 29 is in an upper position. FIG. 23 shows the installation of an insulating pipe 5 separating the supply and return flow by creating an annulus 20 for supply and a return hole 1. After installation of the pipe, the seal is installed.

Figure 24:
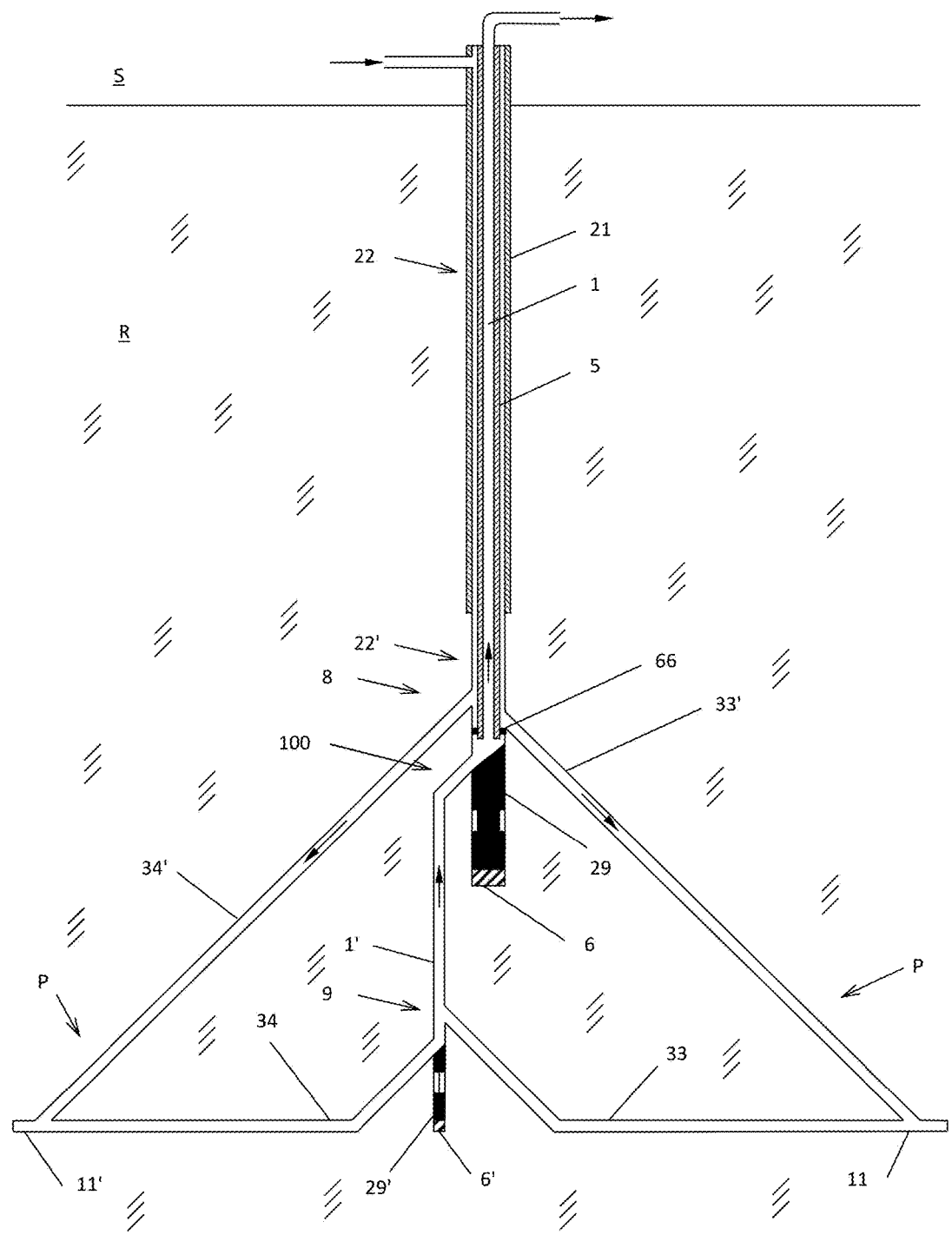
FIG. 24 shows a schematic cross-section of an alternative geothermal energy plant designed for areas with low thermal gradients.

FIG. 24 shows a schematic cross-section drawing of an alternative energy plant for regions with low thermal gradients. The main difference between this design and the design described in FIG. 15 is the sidetracking 100 performed at the bottom of the common supply and return hole 22'. In contrast to the solution shown in FIG. 11 and FIG. 15, the solution shown in FIG. 24 does not require the use of a removable whip-stock 29 and an anchor which can be drilled through in case of possible extension of the plant. The solution is only relevant if the distance between the upper and lower production holes is large and separate whip-stock must be used for upper and lower production holes. The plant shown in FIG. 7 can be expanded or maintained only by removing the insulating pipe.

Figure 25:
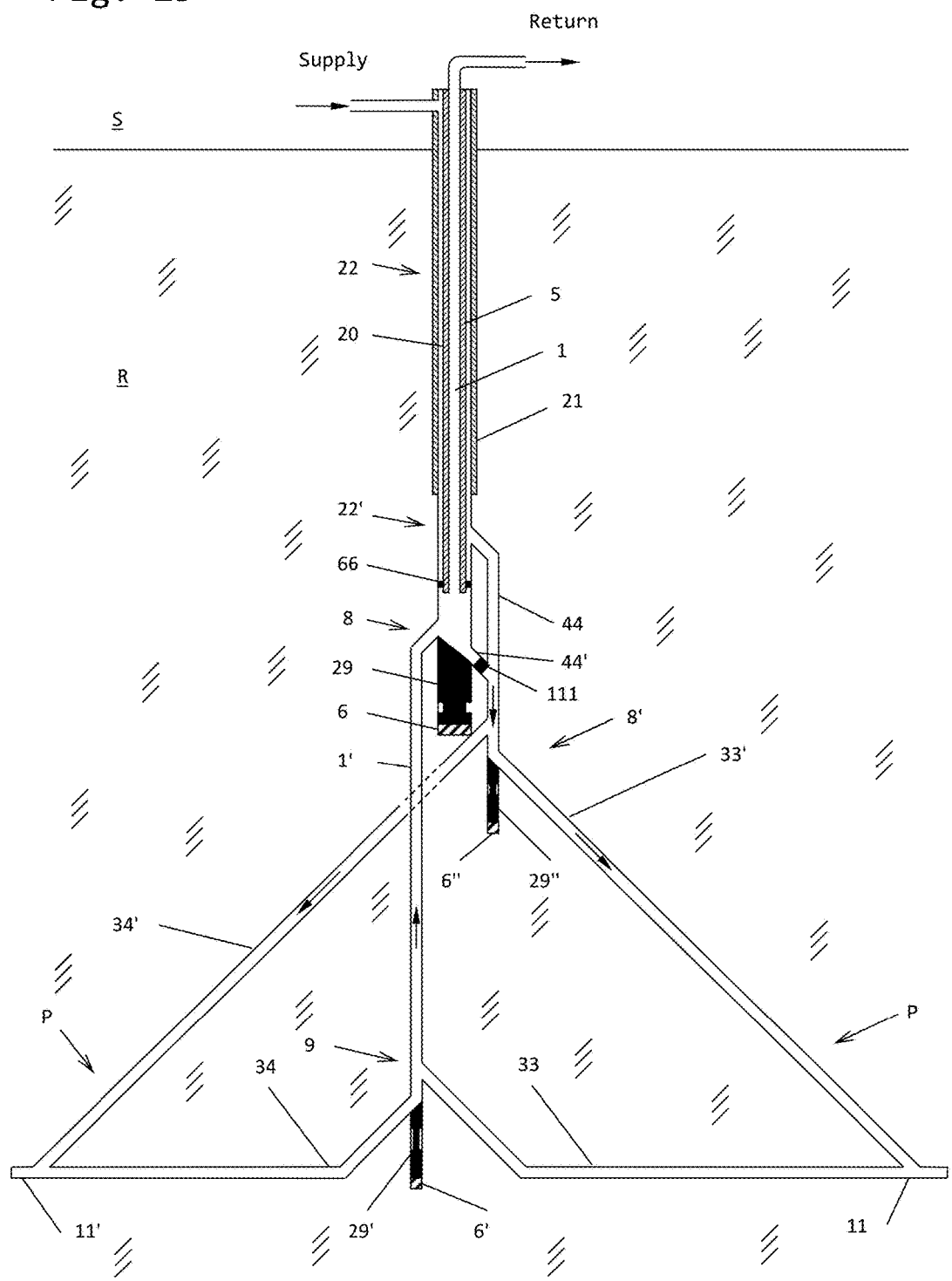
FIG. 25 shows a schematic cross-section of an alternative geothermal energy plant designed for areas with low thermal gradients.

FIG. 25 shows an alternative three-dimensional design of the energy plants presented in FIG. 15 and FIG. 24. The fluid is supplied through an annulus 20 of the combined supply and return hole 22, 22'. Return and supply flows are separated by pipe 5 together with a seal 66. A casing 21 prevents loss of fluid to the surroundings. The flow is guided through a side-tracked hole 44 to the side-tracked upper holes 33', 34'. Whip-stock 29 is used for sidetracking hole 44. Upper holes 33', 34' are sidetracked from hole 44 by use of whip-stock 29". Lower holes 33, 34 are connected to the return hole 1' and further to the upper holes 33', 34' at contact points 11, 11', respectively. The return hole 1' is drilled by sidetracking from hole 22' and use of whip-stock 29. By further drilling and use of whip-stock 29' the lower holes 33, 34 can be made. A side tracked hole 44' between hole 22' and hole 44 has a removable plug 111 that separates the supply and return flows. The advantage of the proposed solution is that the pipe 5 need not be removed during well-clean up and even plant expansion (by drilling). Only plug 111 must be removed or retrieved to gain access to the upper holes 33', 34'. In order to gain access to the lower holes 33, 34 the upper whip-stock 29 must be moved to a proper position.

Even though the figures all show pipes 5 which are insulated, the pipes may or may not be thermally insulated.

The invention claimed is:

1. A geothermal energy plant for extracting thermal energy from a hot dry rock formation with low porosity via a combined supply (20) and return (1) hole (22) extending from a surface of the rock formation wherein a fluid is circulated from the surface through said supply hole (20) and returned to the surface through the return hole (1), and where a pipe (5) separates the supply and return flow in the combined supply and return hole (22), thus forming an annulus and a central flow path, wherein that at a given depth a seal (66) is installed sealing the annulus space by surrounding the pipe (5) separating the supply flow from the return flow, further the combined supply and return hole is extended below the seal (66) forming a lower return hole (1'), the plant further includes one first manifold zone (8) above the seal (66) which is connected with one end of at least one production hole (3, 4; 33 & 33', 34 & 34') formed in the rock formation, and where the other end of the at least one production hole is connected with the lower return hole (1') in one second manifold zone (9) arranged below the seal (66), thus forming a closed loop in which a working fluid can be circulated.

2. The geothermal energy plant according to claim 1, wherein the at least one production hole(-s) (3, 4) is/are side-tracked from the combined supply and return hole (22') above the seal (66) from the first manifold zone (8), and is/are essentially vertically directed and converge towards the second manifold zone (9) below the seal (66) and connect with the return hole (1') thus forming a closed loop in which a working fluid can be circulated.

3. The geothermal energy plant according to claim 1, wherein at least one lower production hole(s) (33, 34) is/are sidetracked from the return hole in a lower section of the combined supply and return hole (22') or from the lower return hole (1') below the seal (66) in the second manifold zone (9) and wherein at least one upper production hole (33', 34') is/are side-tracked from the combined supply and return hole (22') in an upper section of a hole above the seal (66) in the first manifold zone (8), wherein outer ends of the at least one upper and one lower production holes (33' & 33; 34'& 34) are joined via connections (11, 11') to form a production hole in which a working fluid can be circulated in a closed loop.

4. The geothermal energy plant according to claim 2, wherein the at least one production hole(s) (3, 4) from the first manifold (8) is/are mainly vertically directed and extend more than 1000 m.

5. The geothermal energy plant according to claim 3, wherein the at least one production hole(s) (33', 33) drilled from the lower and upper sections is/are mainly horizontally directed and extend more than 1000 m.

6. The geothermal energy plant according to claim 1, wherein a lower part of the combined supply and return hole (22') and the lower return hole (1') are of a uniform diameter.

7. The geothermal energy plant according to claim 1, wherein a lower part of the combined supply and return hole (22') is of a larger dimension than the lower return hole (1').

8. The geothermal energy plant according to claim 1, wherein the at least one production hole(s) (3, 4) is/are of a smaller diameter than a lower part of the combined supply and return hole (22').

9. The geothermal energy plant according to claim 1, wherein the pipe (5) is thermally insulated, such as the pipe (5) being made of thermally insulating material or as a metallic pipe that is thermally insulated.

10. The geothermal energy plant according to claim 1, wherein the return hole is designed to pass a water volume several times larger than the water volume passing through a single production hole.

11. The geothermal energy plant according to claim 1, wherein the combined supply and return hole together with the production holes form a single closed loop for the fluid flow.

12. The geothermal energy plant according to claim 1, wherein the at least one production hole is 10 to 20 cm in diameter, the return hole being 30 to 35 cm in diameter.

13. The geothermal energy plant according to claim 1, wherein the at least one production hole is 2,000 m long and the return hole is up to 5,000 m long.

14. The geothermal energy plant according to claim 7, wherein an anchor (6) for a whip-stock (29) has been placed in the transition between the lower part of the combined supply and return hole (22') and the return hole (1').

15. The geothermal energy plant according to claim 14, wherein the anchor is designed for being drilled through.

16. A method for establishing a geothermal energy plant for extracting thermal energy from a hot dry rock formation with low porosity wherein a combined supply and return hole (22) is drilled to a first predetermined depth, then a lower is drilled to a second predetermined depth forming a lower part (22') of the combined supply and return hole, wherein a first manifold zone (8) is defined at said second predetermined depth, the lower part (22') of the combined supply and return hole is extended by drilling with the same or a smaller diameter hole (1') to a maximum depth wherein a second manifold zone (9) is defined, whereby one or more production hole(s) (P) is/are drilled to form a closed loop between the first manifold zone (8) and the second manifold zone (9) in which a working fluid can be circulated, wherein a pipe (5) is positioned in the combined supply and return hole (22, 22') and a seal (66) being installed between said first and second manifold zones (8, 9) sealing the annulus space (20) between the lower part of the combined supply and return hole (22') and the pipe (5) to separate the supply and return flow.

17. The method according to claim 16, wherein the one or more production hole(s) (P) is/are established in a manner where an anchor (6) is positioned in the bottom of the lower part (22') of the combined supply and return hole (22), a whip-stock (29) is connected to the anchor, one or more production holes (3, 4) of the same or smaller diameter is/are side-tracked from the second pre-determined depth in the lower part (22') of the combined hole above the anchor, the side-tracked holes are drilled and are made to connect with the extended hole (1') in the second manifold zone (9).

18. The method according to claim 16, wherein the one or more production hole(s) (P) is/are established by positioning an anchor (6') and a whip-stock (29') in the bottom of the extended hole (1') which is extended with a smaller diameter than the lower part (22') of the combined supply and return hole (22) and sidetrack drilling one or more lower production holes (33, 34) that communicate with the lower manifold (9), whereby an anchor (6) is positioned in the bottom of the combined supply and return hole (22') and a whip-stock (29) is connected to the anchor, one or more upper production holes (33', 34') is/are side-tracked from the first pre-determined depth in the combined supply and return hole (22') and being in communication with the upper manifold zone (8) wherein said upper production holes (33',34') are connected with said lower production holes (33, 34) via connections (11, 11'), respectively to form production holes (P), thereafter the whip-stock(-s) (29, 29') is/are removed.

19. The method according to claim 16 wherein the one or more production hole(s) (P) is/are established by positioning an anchor (6') and a whip-stock (29') in the bottom of the extended hole (1') which is extended with the same diameter as the lower part of the combined supply and return hole (22') and sidetrack drilling one or more lower production holes (33, 34) that communicate with the lower manifold (9), whereby the whip-stock (29') is removed and a longer whip-stock (29''') is connected to the anchor (6'), one or more upper production hole(s) (33', 34') is/are side-tracked from the first predetermined depth in the combined supply and return hole (22') and being in communication with the upper manifold zone (8) wherein said upper production holes (33',34') are connected with said lower production holes (33, 34) via connections (11, 11'), respectively to form production holes (P), thereafter the longer whip-stock (29''') is removed.

20. The method according to claim 17 wherein the one or more production hole(s) (3, 4) is/are mainly vertically directed in case the one or more production hole(s) is/are made to converge with the extended hole (1') in the second manifold zone (9).

21. The method according to claim 18 or 19 wherein the one or more productions hole(s) (33', 34') and (33, 34) is/are mainly horizontally directed, and connected via connections (11, 11').

22. The method according to claim 17 or 18 wherein the anchor (6) is combined with the seal (66) and separates the supply and return flow.

23. The method according to claim 16 wherein the extended hole (1') is extended by first sidetracking using a whip-stock (29) and anchor (6) and then drilled mainly vertically to a maximum depth.

24. The method according to claim 16 wherein the extension of extension hole (1') is sidetracked using a whip-stock (29) and anchor (6) and then drilled mainly vertically to a maximum depth, the anchor (6') and whip-stock (29') are then positioned at the bottom of the side-tracked of the extension hole (1'), one or more lower production holes (33, 34) are subsequently side-track drilled mainly in the horizontal direction from different positions along the side-tracked part of the extension hole (1') using the whip-stock (29'), a second essentially vertical hole (44) is side-track drilled from the combined supply and return hole (22') using the first whip-stock (29) and anchor (6), whereupon the whip-stock (29'') and anchor (6'') are placed at the bottom of this second vertical hole (44), and used to side-track drill essentially horizontal upper production holes (33' 34'), so that they converge and meet lower production holes (33, 34) in connections (11, 11') wherein a third hole (44') is sidetracked from the lower part of the combined supply and return hole (22') forms a connection between extension hole (1') and the second vertical hole (44), and that a removable plug (111) is inserted in the third hole (44').

* * * * *